(12) United States Patent
Gipson

(10) Patent No.: US 9,797,177 B2
(45) Date of Patent: Oct. 24, 2017

(54) WINDOW ASSEMBLY WITH MOVABLE PANE

(71) Applicant: Dura Operating, LLC, Auburn Hills, MI (US)

(72) Inventor: Ronnie G. Gipson, Metamora, MI (US)

(73) Assignee: Durata Operating, LLC, Auburn Hills, MI (US)

( * ) Notice: Subject to any disclaimer, the term of this patent is extended or adjusted under 35 U.S.C. 154(b) by 0 days.

(21) Appl. No.: 15/002,100

(22) Filed: Jan. 20, 2016

(65) Prior Publication Data

US 2016/0208536 A1 Jul. 21, 2016

Related U.S. Application Data

(60) Provisional application No. 62/105,573, filed on Jan. 20, 2015.

(51) Int. Cl.

| E05F 11/48 | (2006.01) |
|---|---|
| E05D 15/06 | (2006.01) |
| E05D 13/00 | (2006.01) |
| E05F 11/38 | (2006.01) |
| B60J 1/18 | (2006.01) |
| E05F 15/646 | (2015.01) |

(52) U.S. Cl.
CPC ........... *E05F 11/488* (2013.01); *B60J 1/1853* (2013.01); *E05D 13/10* (2013.01); *E05D 15/0621* (2013.01); *E05F 11/382* (2013.01); *E05F 15/646* (2015.01)

(58) Field of Classification Search
CPC ............ E05D 15/0604; E05D 15/0608; E05D 15/0613; E05D 15/10; E05D 15/1047; E05D 15/055; B60J 1/1853; E05F 11/53; E05F 11/535; E05F 11/488

USPC ..................................................... 48/380, 413
See application file for complete search history.

(56) References Cited

U.S. PATENT DOCUMENTS

| 4,850,139 A | 7/1989 | Tiesler | |
|---|---|---|---|
| 5,473,840 A * | 12/1995 | Gillen | ...................... B60J 10/74 49/380 |
| 5,613,323 A | 3/1997 | Buening | |
| 5,799,444 A * | 9/1998 | Freimark | ............... B60J 1/1853 49/209 |
| 8,402,695 B2 | 3/2013 | Smith et al. | |
| 2002/0148163 A1* | 10/2002 | Warner | ............... E05D 15/0652 49/209 |
| 2004/0074149 A1* | 4/2004 | Tatsumi | ................. B60J 5/0416 49/352 |

(Continued)

*Primary Examiner* — Gregory Strimbu
(74) *Attorney, Agent, or Firm* — Reising Ethington P.C.; Matthew J. Schmidt; Robert E. Ford

(57) ABSTRACT

A window assembly may include a pane movable between open and closed positions, a cam having a cam surface, and a cam follower coupled to the movable pane for movement relative to the cam surface and engageable with the cam surface when the movable pane is near or in the closed position. The cam surface may be inclined toward a seal to direct the movable pane into the seal when the movable pane moves into the closed position. The cam surface may include a linear portion that extends along at least a majority of the path of travel of the movable pane. The cam follower may remain engaged with the cam surface throughout a desired portion of the path of travel of the movable pane.

18 Claims, 18 Drawing Sheets

(56) References Cited

U.S. PATENT DOCUMENTS

| | | | |
|---|---|---|---|
| 2004/0098919 A1* | 5/2004 | Bourque | B60J 1/1853 49/413 |
| 2006/0174544 A1* | 8/2006 | Dufour | E05F 11/535 49/413 |
| 2006/0260205 A1 | 11/2006 | Dufour et al. | |
| 2010/0107505 A1* | 5/2010 | Schreiner | E05D 15/0608 49/413 |
| 2012/0117880 A1* | 5/2012 | Lahnala | B60J 1/1853 49/70 |
| 2012/0291353 A1* | 11/2012 | Gipson | B60J 1/1853 49/70 |
| 2013/0038093 A1 | 2/2013 | Snider | |
| 2013/0174488 A1 | 7/2013 | Snider et al. | |
| 2013/0255156 A1* | 10/2013 | Snider | B60J 1/1853 49/130 |
| 2015/0052814 A1 | 2/2015 | Snider et al. | |
| 2015/0292256 A1* | 10/2015 | Bender | B60J 1/1853 49/359 |

* cited by examiner

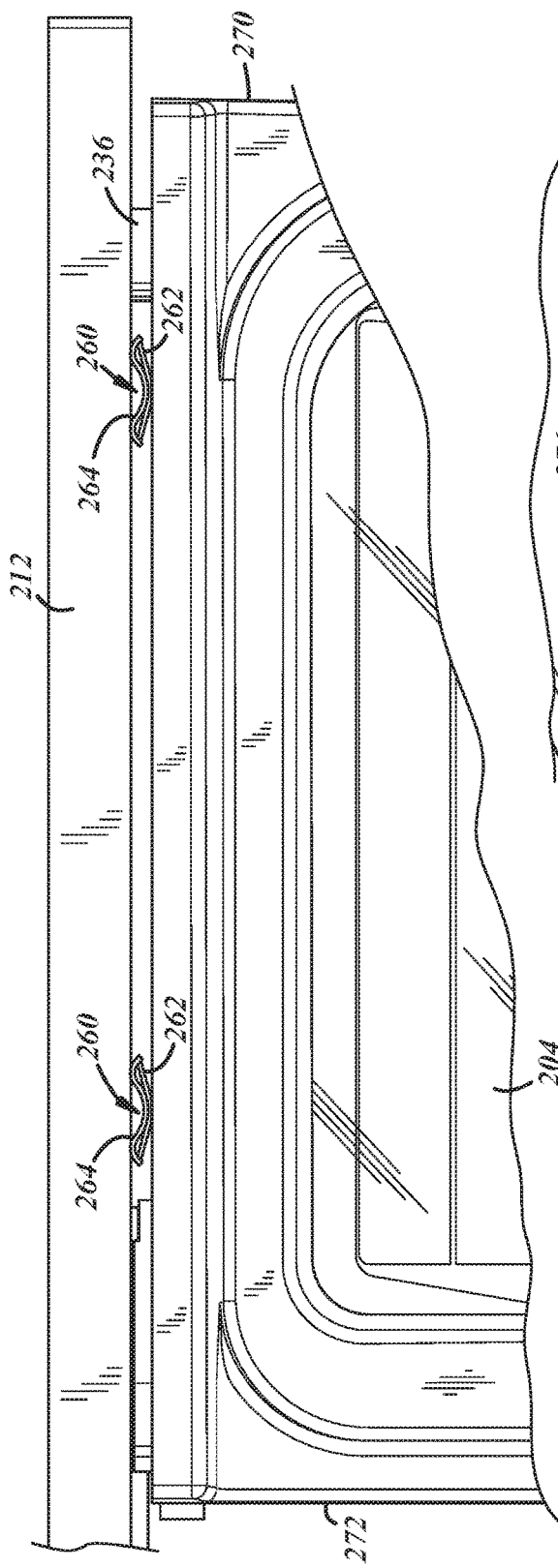
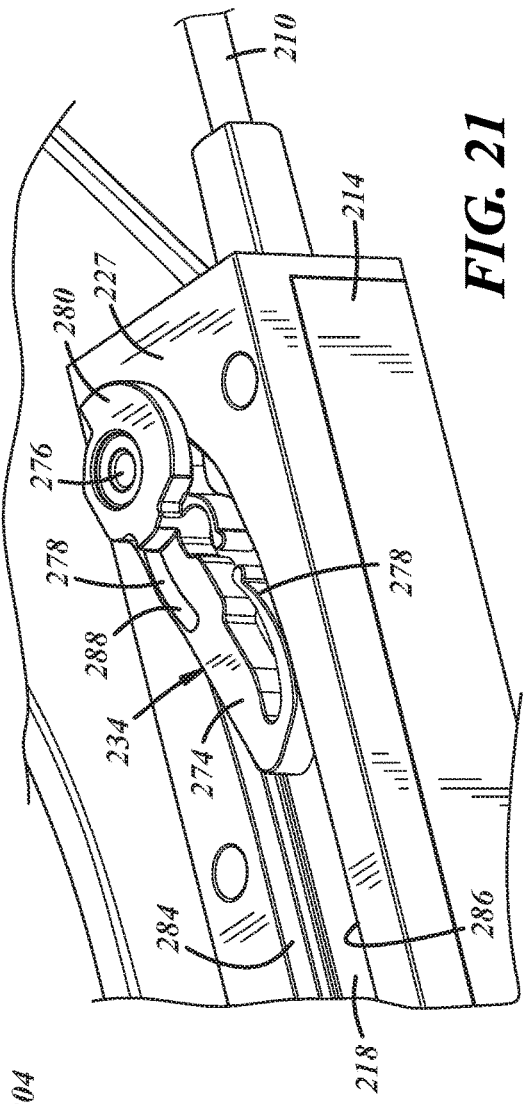
FIG. 20
FIG. 21

WINDOW ASSEMBLY WITH MOVABLE PANE

REFERENCE TO COPENDING APPLICATION

This application claims the benefit of U.S. Provisional Patent Application Ser. No. 62/105,573 filed Jan. 20, 2015, which is incorporated herein by reference in its entirety.

TECHNICAL FIELD

The present disclosure relates to movement control members for a window assembly with a movable pane.

BACKGROUND

Pickup trucks may include a rear window assembly that defines part of a passenger compartment of the vehicle. The window assembly may include a movable pane that selectively closes an opening to the exterior of the vehicle. The movable pane may be driven by an actuator or manually opened. Some movable panes are flush with adjacent fixed panes when the movable pane closes the opening. These movable panes have a compound motion or path of travel between their open and closed positions that permits the movable pane to move into and out of plane with the fixed panes so that the movable pane can be laterally moved relative to the fixed panes and the opening. It can be difficult to reliably close the movable pane against seals surrounding the opening, and to control compound movement of a flush sliding window.

SUMMARY

A window assembly may also or instead include a movable pane movable between open and closed positions, a cam having a cam surface, and a cam follower coupled to the movable pane for movement relative to the cam surface and engageable with the cam surface when the movable pane is near or in its closed position. The cam surface is inclined to direct the movable pane into a seal when the movable pane moves toward its closed position.

A wire control assembly may be provided for a window assembly with a movable window and a wire connected to the movable window. The wire control assembly may include a body defining a wire receiving area in which a mid-section of the wire is received and maintained separately from adjacent components.

Some implementations of a window assembly may include a movable window movable between open and closed positions, an actuator, and a cable coupled to the window and driven by the actuator to move the window between open and closed positions, the cable including a core received within a casing and movable relative to the casing to both push and pull the movable window.

Some implementations of a window assembly may include a movable window movable between open and closed positions, an actuator, and two cables coupled to the movable window and driven by the actuator to move the movable window between open and closed positions. At least one of the cables includes a stop connected thereto. And a stop surface is engageable by the stop to define a fully closed position of the movable window, wherein the position of the stop relative to the window may be adjusted to adjust the fully closed position of the movable window.

Other embodiments can be derived from combinations of the above and those from the embodiments shown in the drawings and the descriptions that follow. Further, within the scope of this application it is envisaged that the various aspects, embodiments, examples, features and alternatives set forth in the preceding paragraphs, in the claims and/or in the following description and drawings may be taken independently or in any combination thereof. For example, features disclosed in connection with one embodiment are applicable to all embodiments, except where there is incompatibility of features.

BRIEF DESCRIPTION OF THE DRAWINGS

The following detailed description of preferred implementations and best mode will be set forth with regard to the accompanying drawings, in which:

FIG. 1A shows the movable window in its closed position closing the opening and FIG. 1B shows the movable window in an open position with at least part of the opening exposed;

FIG. 13 shows the movable window in its closed position wherein the movable pane closes the opening and FIG. 14 shows the movable window in an open position with at least part of the opening exposed;

FIG. 17 is a sectional view showing a portion of the guide track, the trolley and the guide follower in the position of FIG. 15;

FIG. 20 is a front view of a portion of the movable window assembly and upper guide track;

FIG. 21 is a perspective view of a portion of the lower guide track and a shuttle received in the lower guide track;

DETAILED DESCRIPTION

Figure 1A:
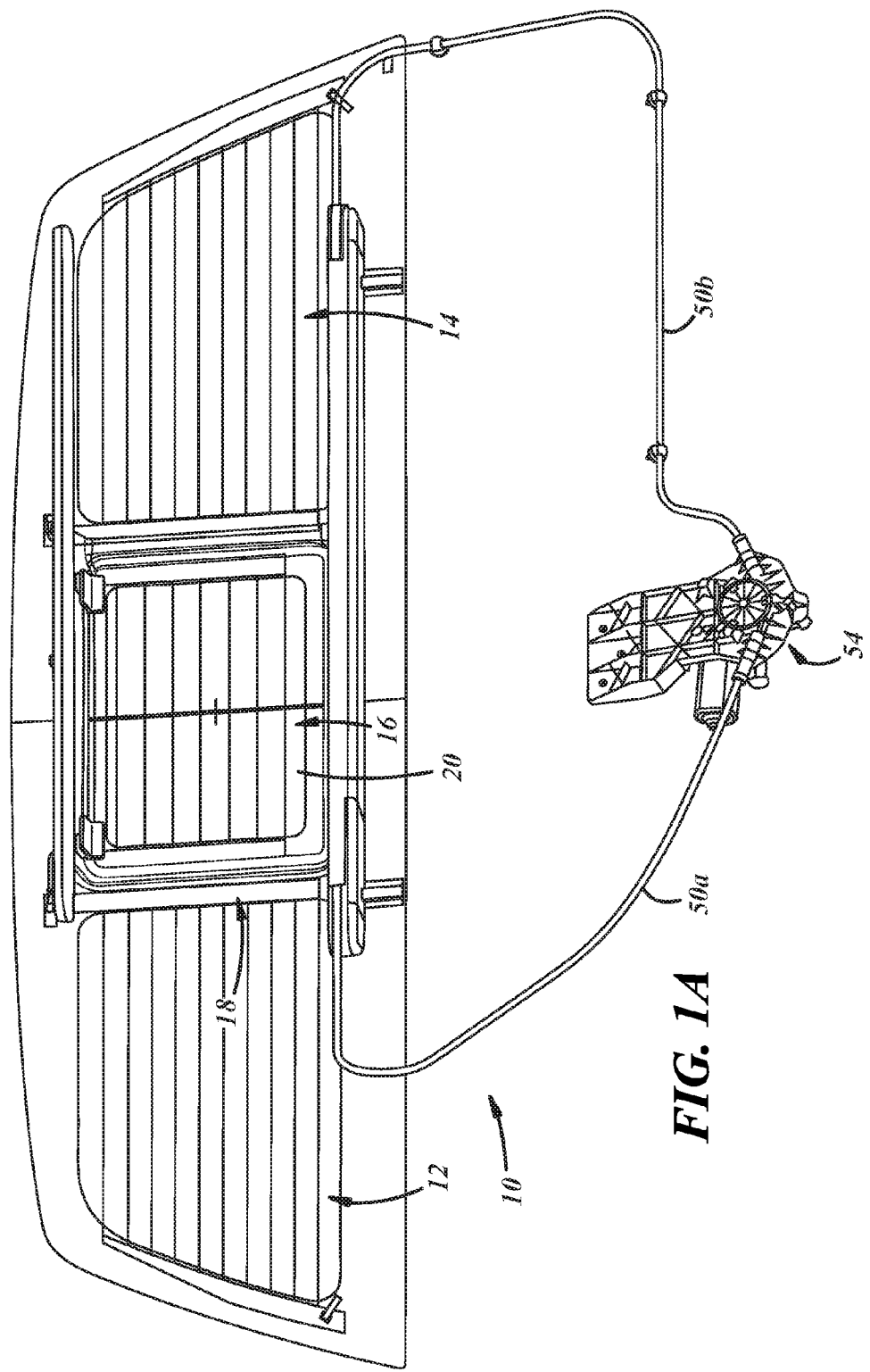
FIGS. 1A and 1B are perspective views of a window assembly having two fixed panes, an opening between them, and a movable pane movable relative to the opening.
Figure 1B:
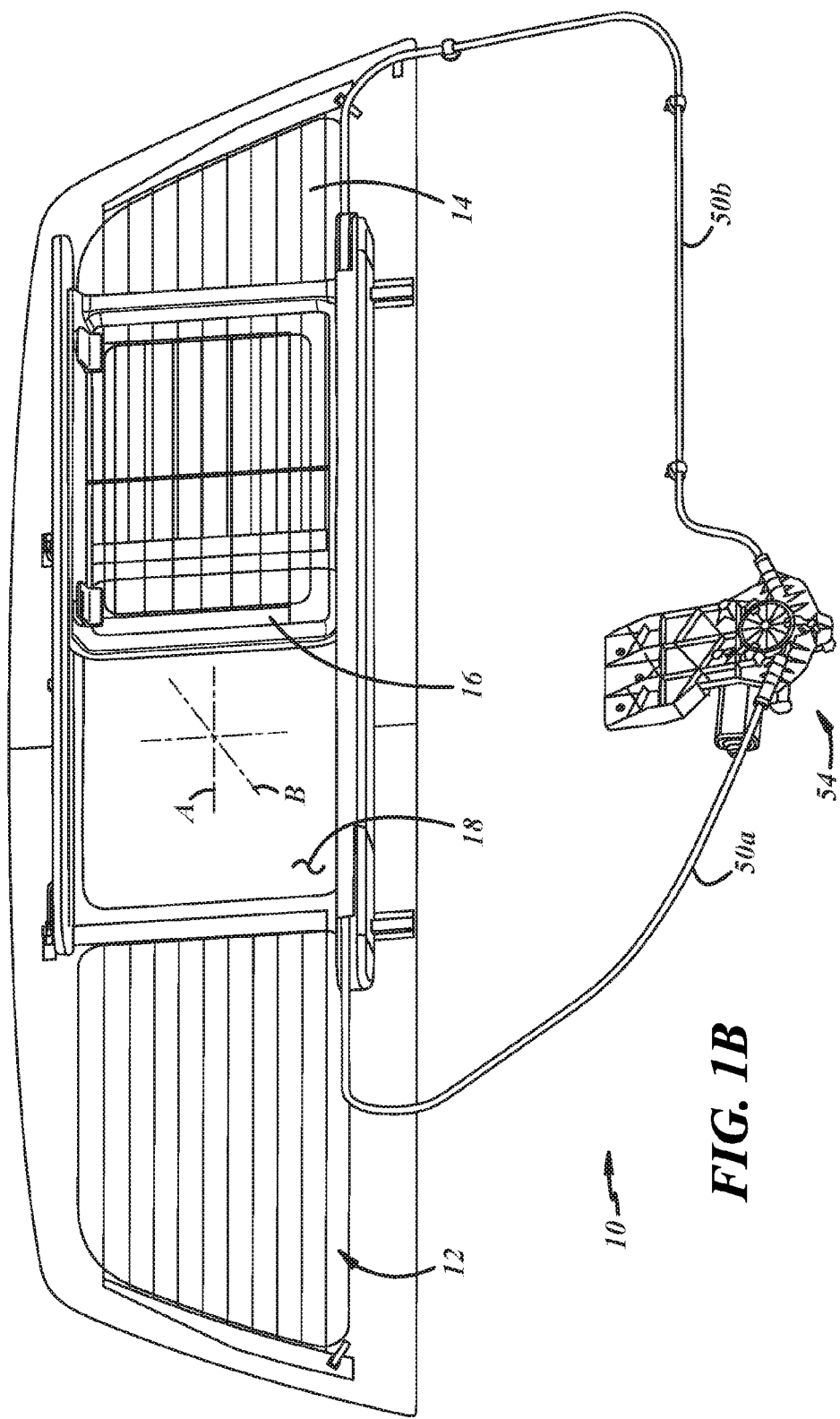

In general, this description includes various example implementations of a motor vehicle window assembly 10. As shown in FIGS. 1A and 1B, the window assembly 10 may include one or more fixed panes 12, 14 that do not move when installed on a vehicle and one or more movable windows or window panes 16 that do move after installation on a vehicle. The window assembly may be used as a rear window for a pick-up truck passenger compartment. The window assembly 10 may be a frameless, one-piece fixed pane type of backlight of a pickup truck, or any other suitable type of window assembly including, but not limited to, a backlight having a frame carrying one or more fixed panes. In at least some forms, the window assembly 10 includes one or more fixed panes (in FIGS. 1A and 1B, two fixed panes 12, 14 are shown), an opening 18 defined between the fixed panes (or defined within a single pane), and a movable window 16 that is moved relative to the opening. The movable window 16 may have a closed position wherein the movable window fully overlaps or closes the opening 18 to prevent wind and water passing through the opening, and an open position wherein the movable window is moved from its closed position and only partially overlaps or does not overlap the opening at all.

Figure 2:
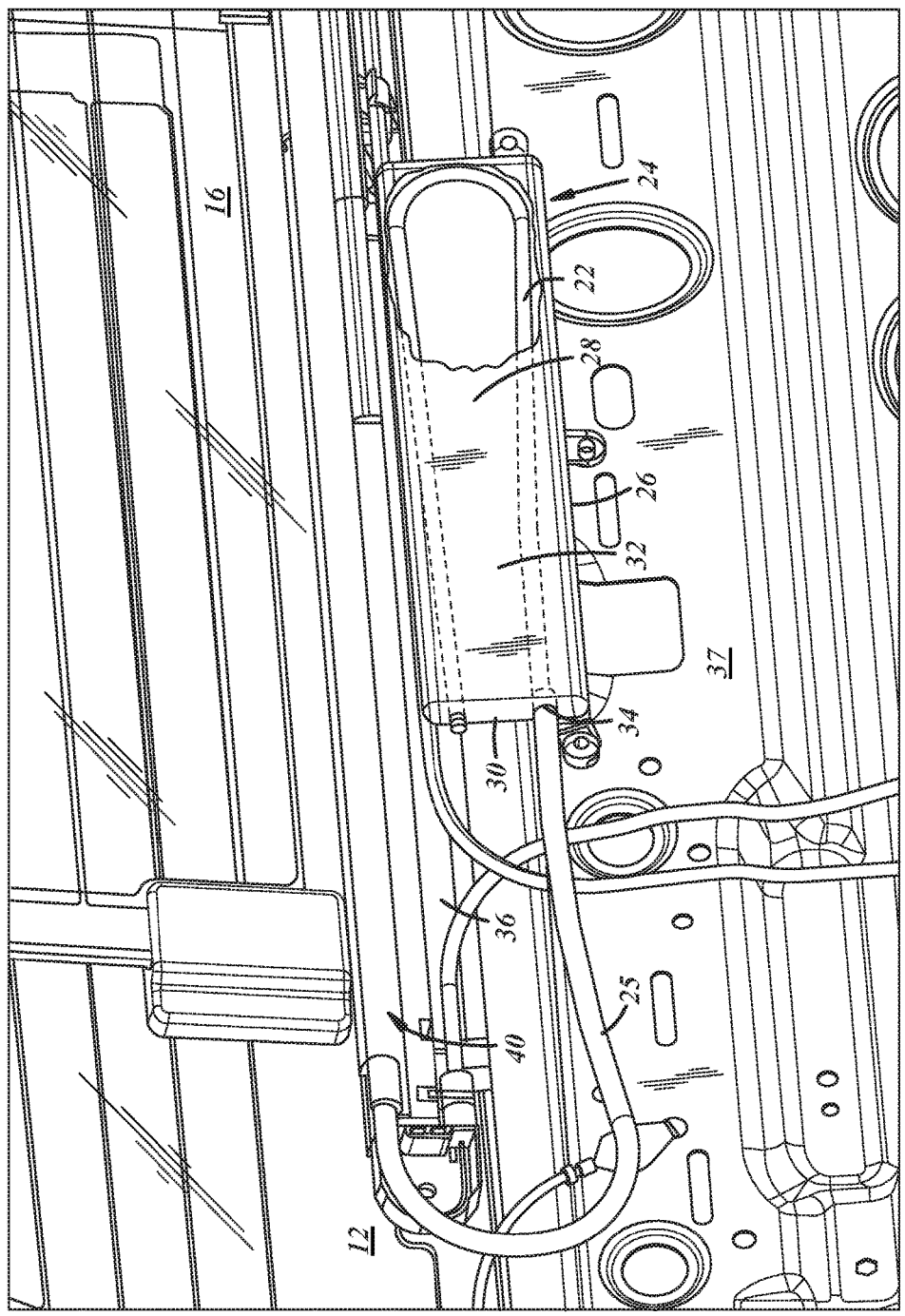
FIG. 2 is a fragmentary perspective view showing a wire control assembly.
Figure 3:
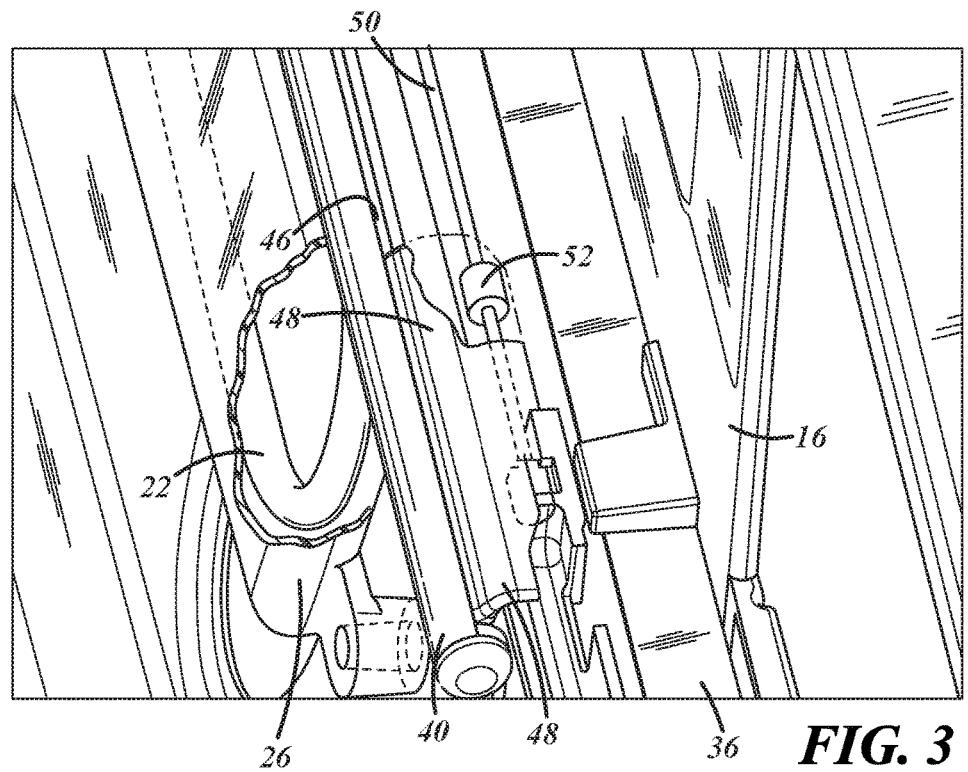
FIG. 3 is a fragmentary perspective view showing a portion of the wire control assembly.
Figure 4:
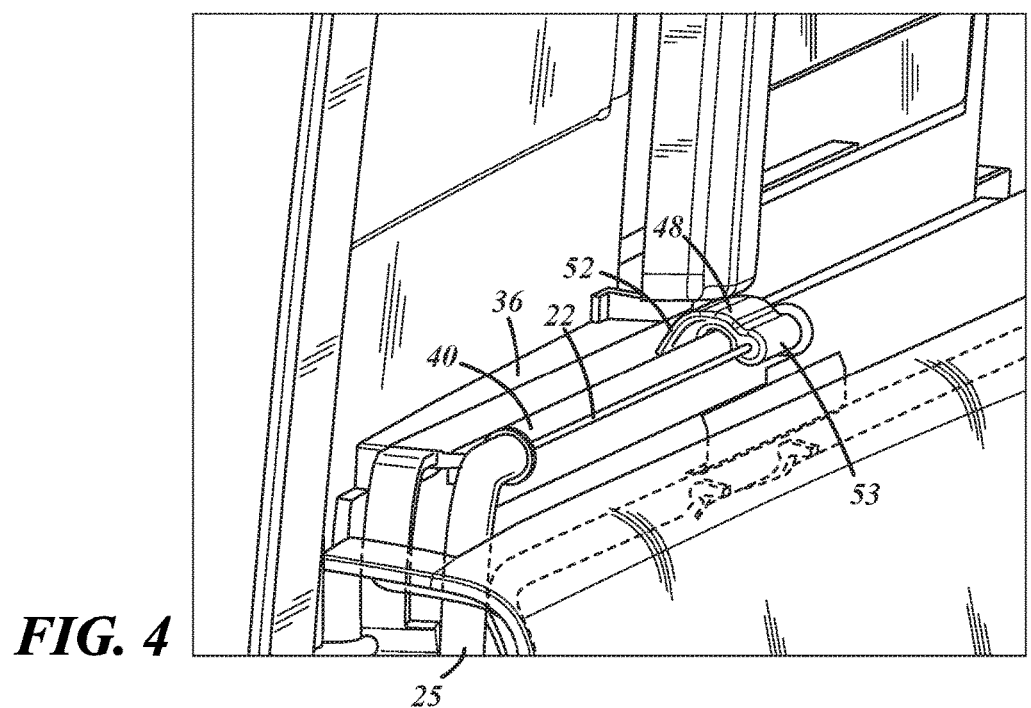
FIG. 4 is a fragmentary perspective view showing a portion of the wire control assembly.
Figure 5:
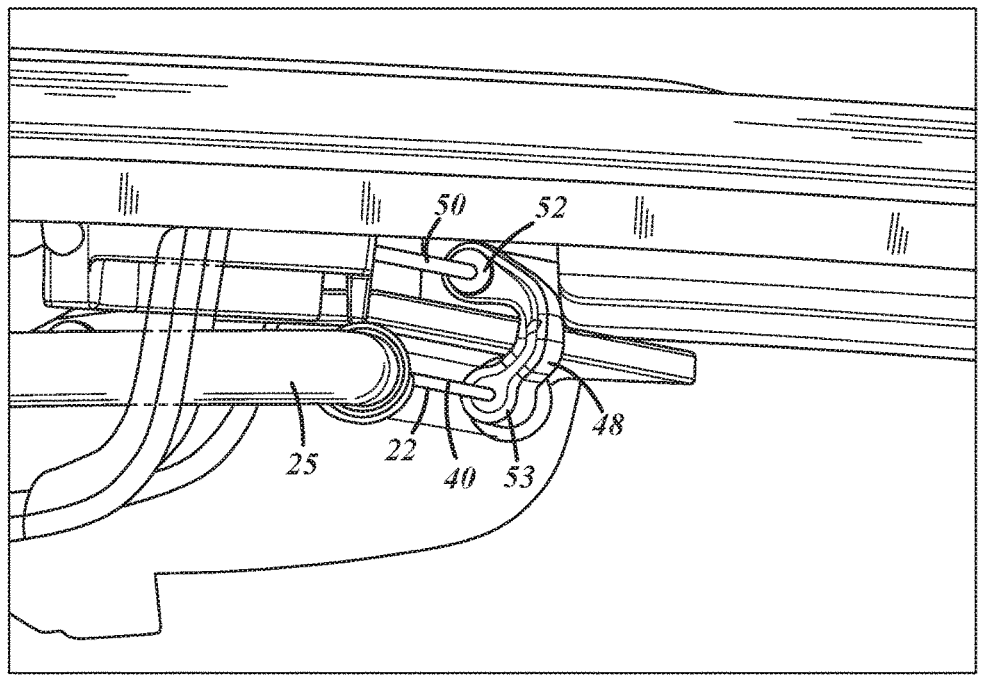
FIG. 5 is a fragmentary perspective view showing a portion of the wire control assembly including a guide tube and coupler.
Figure 6:
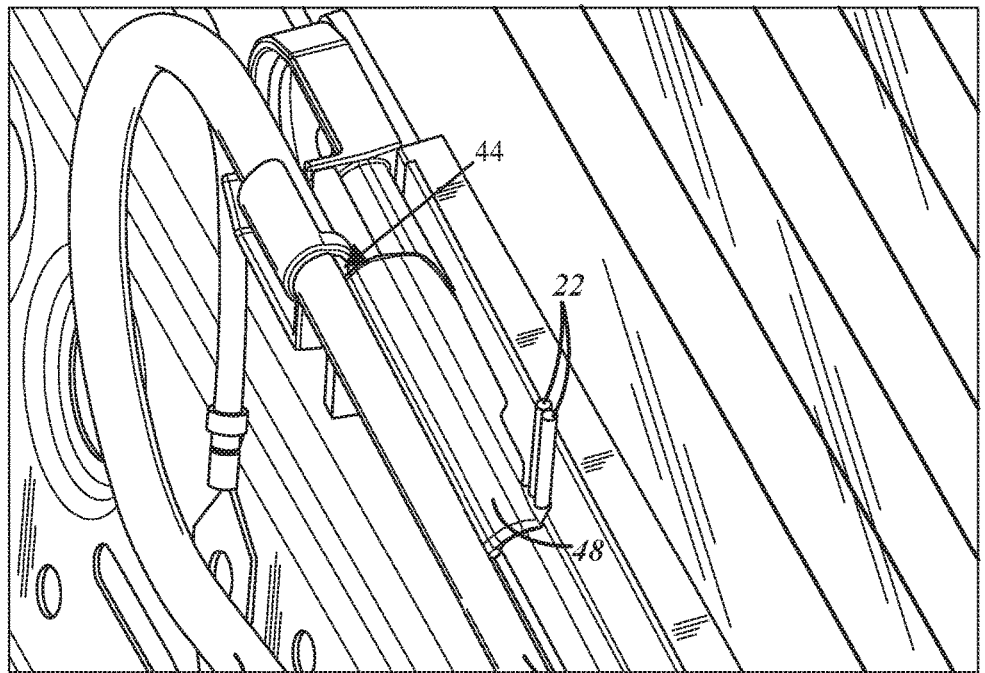
FIG. 6 is a fragmentary perspective view showing a portion of the wire control assembly including the coupler shown in a second position corresponding to the fully open position of the movable window.

The movable window 16 may be moved in any suitable manner by any suitable means. For example, as shown in FIGS. 1 and 2, the window assembly 10 also may include an actuator 54 and one or more actuator cables 50a, 50b coupled to the actuator 54 and to the movable window assembly 18 to open and close the movable window assembly 18. In one implementation, the actuator 54 may be electrically powered and may include, for example, an electric motor and a cable-drum window regulator including the cables 50a, 50b.

In a first implementation, one or more of the window panes including the movable window 18, may include an electrically powered defroster 20. Electric power may be provided to the window 16 through one or more wires 22 (FIG. 2—may include positive and negative power leads) connected to the window 16, such as part of a defrost grid 20 or other defrost component associated with the window.

In this way, the movable window 16 may be powered directly and part of the wires 22 move with the movable window. The wire is electrically conductive and an advantageous wire may include a flat wire. An example of a flat wire is a solid copper wire that is not circular in cross-section, and may be wider than it is thick. The wires 22 may include an insulating or isolating coating or cover, as desired. The wires 22 may be received in common tube or insulating cover 25 and may thereby move as a single unit. Hence, the wires may be referred to herein as a single wire 22 rather than multiple wires, although both arrangements are intended to be included in this disclosure. Movement of the defrost wire 22 can be problematic in that they may cause interference with other components, such as cables or motors used to move the movable window 16 between its open and closed positions. Further, the wire or wires 22 may bunch, gather or curl up and become stuck or protrude into view from the passenger compartment.

While not shown, the opposite end of the wires is connected to a source of electrical power, such as through an electrical connector, to supply the defroster with electrical power through the one or more conductors, such as wires 22. With the wires 22 connected at one end to the movable window 16 and at their other end to a power source (or an outlet or connector associated therewith), the length of the wires is constant, but the distance between the connected ends of the wires changes as the window moves. Hence, slack in the wires 22 is provided in one position of the movable window 16 and all or part of that slack may be taken up as the movable window changes position to accommodate the window movement.

To control the defrost wire 22 movement as the movable window pane moves, a wire control assembly 24 may be provided as shown in FIGS. 2-6. In at least some implementations, the wire control assembly 24 includes one or both of a guide tube 25 and a body or housing 26 that defines at least part of an enclosure. In the implementation shown, the housing 26 is generally rectangular with an outer wall or face 28 and one or more sidewalls 30 extending therefrom. The housing 26 may be adapted to be connected to a vehicle wall or other structure to define an at least somewhat enclosed wire receiving area 32 in which at least a portion of the wires 22 are received. The sidewalls 30 may be at least as wide as the wire 22 are thick so that there is sufficient space for the wires to coil, bend or move within the receiving area 32. Of course, the housing 26 could define the wire receiving area 32 without depending upon another structure to define part of the area.

An opening 34, slot or other void is provided through the housing 26 or otherwise in communication with the wire receiving area 32 so that a portion of the wires 22 may be received in the wire receiving area. The opening 34 may be provided in a sidewall 30 and the wires 22 may be increasingly received through the opening 34 and paid out therefrom as the movable window 16 is moved. The sidewall 30 may have a height sufficient to permit the wire to roll or coil at least partially in the wire receiving area 32 to facilitate taking up slack in the wire and accommodating window movement. The opening may receive an end of the guide tube and the wires 22 may extend out of the opening 34 and into and through the guide tube 25.

The guide tube 25 may be coupled at one end to the opening and at its other end to a cover 40 or tube extension that leads to the movable window assembly. The tube 25 may be sized to limit bending of the wires therein so that the wire is somewhat rigid and slides more easily within the tube 25. The tube may include a bend having a radius that does not stress the wire 22 and which the wire can easily traverse with requiring significant force. The tube may be formed of any desired material and is shown as being a molded plastic tube.

In the implementation shown, the wires 22 are routed along a frame member or guide rail 36 (shown as transparent in FIGS. 7-9 and 11 to better illustrate other components in those views) of the window assembly 10 that is provided to guide movement of the movable window 16. The track or guide rail 36 may also provide part of a support or frame for one or more fixed window panes 12, 14, if desired. The wires 22 may be routed in the guide rail 36 and generally out of view and not overlapping the window panes 12, 14, 16. At an end of the guide rail 36, or other location where the wires 22 leave the rail (a non-limiting example is that the wire could pass through an opening in the rail), the wires 22 are routed to the opening 34 of the wire control member 24. In the implementations shown, movement of the movable window 16 toward its open position increases the length of the wires 22 in the wire receiving area 32 and movement of the window 16 toward its closed position reduces the length of the wires 22 received in the wire receiving area. Of course, this could be reversed by routing the wire in a different manner and orienting the wire control member in a different manner.

Hence, the wire control member 24 and tube 25 accommodate a mid-portion of the wires 22, between the defroster and the power source for the defroster. More specifically, the control member 24 accommodates slack in the wires 22 which is managed in and paid out from the wire receiving area 32 in a controlled manner. The housing 26 may have a first wall 28 and a second wall spaced from the first wall with the wire receiving area defined between the walls so that the wire is contained between the walls and within the housing. The second wall may be defined by the housing, or it may be part of a vehicle panel 37 to which the housing is connected. In at least some implementations, the housing 26 may be independent of the guide rail 36, the housing may be positioned below the guide rail (e.g. on the opposite side of the guide rail as the windows), and the wire receiving area 32 may be isolated from the window panes 12, 14 or 16, and in some implementations may also be isolated from the guide rail 36.

The cover 40 (shown as transparent or mostly transparent in FIGS. 4 and 5 to show internal components) may extend from the tube and be provided in the area of and may be connected to the guide rail 36. The cover 40 may be provided to maintain the wires 22 within a desired space and to prevent the wires from entering a different space, such as where the wire would become visible, for example, by overlapping a window pane 12, 14, 16. The cover 40 may be carried by the window assembly 10, such as by the guide rail 36 or a frame member. The cover 40 may overlap a channel 44 in which the wires 22 are routed, or, as shown, the cover 40 may define all or part of a channel in which the wires 22 are routed. In the implementation shown, the cover 40 is an least partially tubular member in which the wires 22 are routed and in which the wires move when the movable window 16 moves. This may facilitate keeping the wires 22 separate and away from cables or other components, such as cables used to move the movable window 16 (e.g. in a powered sliding window system as described below). The cover 40, in the example shown, is connected to the guide rail 36 and is positioned beneath the window panes (in the orientation of the window assembly 10 as installed on a vehicle and shown in FIG. 2). The cover 40 may include a slot or opening 46 along at least part of its length to receive a coupler 48 that connects the wires 22 to the movable window 16 or a component that moves with the movable window 16.

The coupler 48 may be received partially in the opening 46 and may be coupled to both the wires 22 and to a cable 50 used to move the movable window 16. The coupler 48 may be a rigid, molded body that is coupled to the cable 50 in any suitable manner, such as by a bead 52 crimped or otherwise connected to the cable. When the movable window 16 is moved, the cable 50 also moves and this motion is transmitted to the defrost wires 22 by the coupler 48. This takes stress off of the defrost wires 22, and specifically their point of connection to the movable window 16. The coupler 48 also enables the defrost wires 22 to be offset from the cable 50 to avoid interference with the cable or damage to the defrost wires. In the implementation shown, the defrost wire 22 and cover 40 are generally parallel to the cable 50. The coupler 48 may have a length in the direction of movement of the wire 50 that is greater than a width transverse to the length, to prevent cocking or twisting of the coupler 48 relative to the cover 40. The coupler 48 may also have an enlarged and rounded portion 53 at the junction with the wires 22, and the rounded portion 53 may be adapted for a close (i.e. guided) but low friction sliding engagement within the cover 40.

In at least some implementations, the sliding window 16 may be implemented in so-called flush sliding window assembly. In a flush sliding window assembly, the movable window 16 is generally aligned with the fixed panes 12, 14 or a frame when the movable window 16 is in its closed position. This provides a generally smooth, continuous exterior of the window assembly 10 with the exterior surfaces of the fixed and movable panes aligned, or generally planar (relative to the assembled position of the window assembly wherein the exterior surface of the panes face outwardly, away from the passenger compartment and the interior surfaces of the panes face inwardly toward the passenger compartment). When the movable window 16 is moved away from its closed position, the movable window must move either inwardly toward or outwardly away from the passenger compartment before or as the movable window 16 is moved laterally to uncover at least part of the opening 18 between the fixed panes 12, 14.

To provide this compound movement of the movable window 16, the guide rail 36 has at least a portion that is not linear or straight. Instead, a portion of the guide rail 36, or a track defined therein, is curved in a desired shape to provide a compound movement that has a first component generally perpendicular to a plane including the fixed panes 12, 14 (called "transverse" herein and generally along line or plane B in FIG. 1B) and a second component generally parallel to that plane (called "lateral" herein and generally along line or plane A in FIG. 1B). While the terms "plane" and "planar" are used herein, it is recognized that the fixed panes 12, 14 and/or the movable window 16 may have some curvature, that is, they might not be flat or planar. Nonetheless, they may be considered to be in the same general alignment or plane in the closed position shown in FIG. 1 even if they are not entirely within any given plane. This compound movement both moves the movable window 16 transversely out of plane with the fixed panes 12, 14 and also laterally relative to the fixed panes. To control this compound movement, a guide follower 60 coupled to the movable window 16 rides along the guide rail 36 to provide a desired path of motion for the movable window.

In the closed position of the movable window 16, the window engages seals to provide an air and water tight interface to prevent air and water intrusion into the passenger compartment around the movable window. If the seals are not sufficiently engaged, wind noise may be elevated and/or water may enter the passenger compartment. Accordingly, to be satisfactory for commercial use, the movable window 16 must sufficiently engage the seals. To assist in fully closing the movable window 16, a force assist member may be provided.

Figure 8:
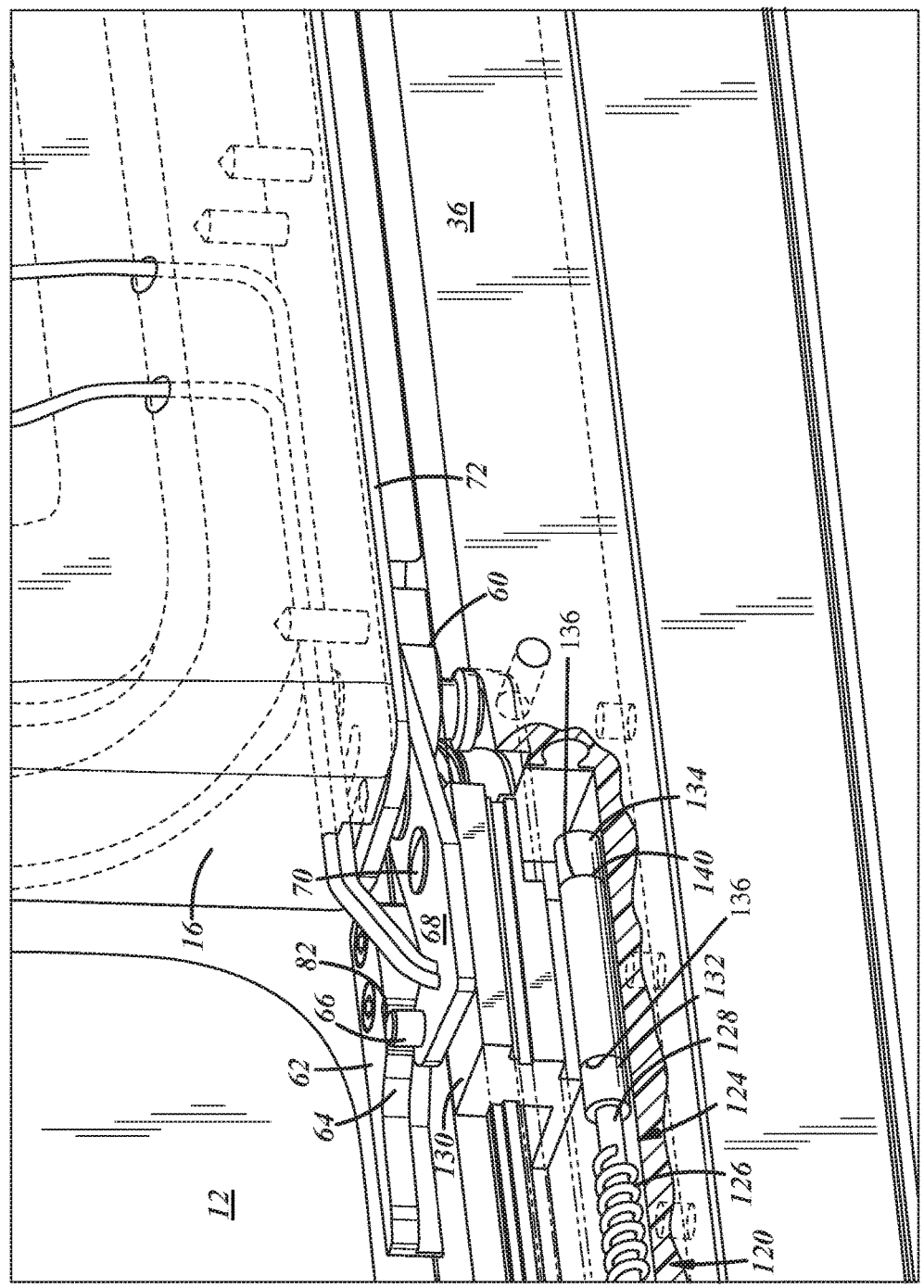
FIG. 8 is a fragmentary perspective view of a portion of the window assembly showing a portion of the movable window and part of another drive system used to move the movable window.
Figure 9:
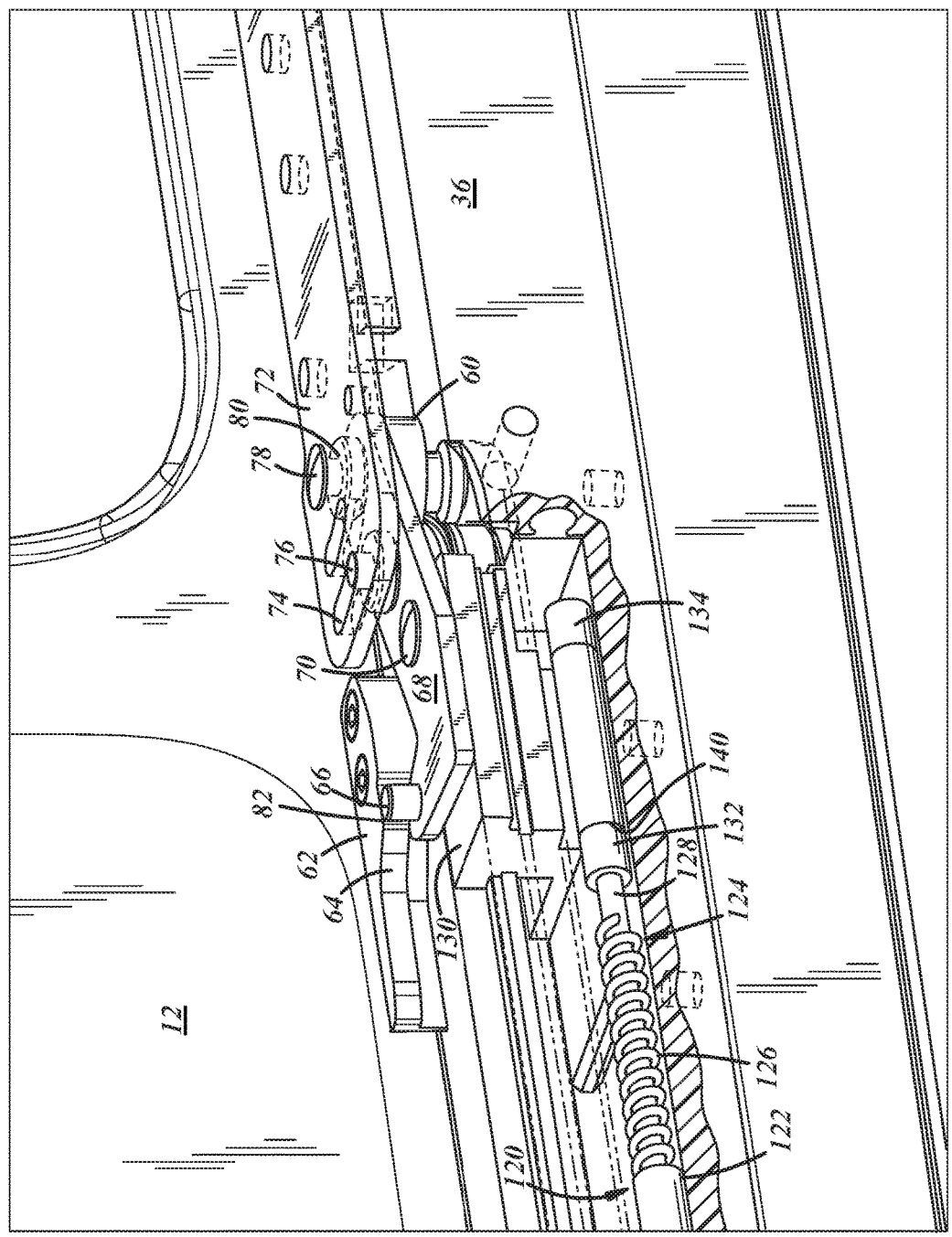
FIG. 9 is a view similar to FIG. 8 with the movable window removed.

As shown in FIGS. 8 and 9, in at least some implementations, the force assist member may include a cam 62 that may be coupled on or adjacent to the guide rail 36, particularly at or near the curved or non-linear portion of the guide rail 36 that defines the initial compound movement of the movable window out of its closed position. The cam 62 may have a cam surface 64 with a desired shape or profile to cause a desired transverse movement of the window 16 toward its fully closed position. In the implementation shown, the movable window 16 moves inwardly toward the passenger compartment, as it moves away from its closed position and thus, the window 16 moves outwardly and generally away from the passenger compartment when moving toward its closed position.

Figure 7:
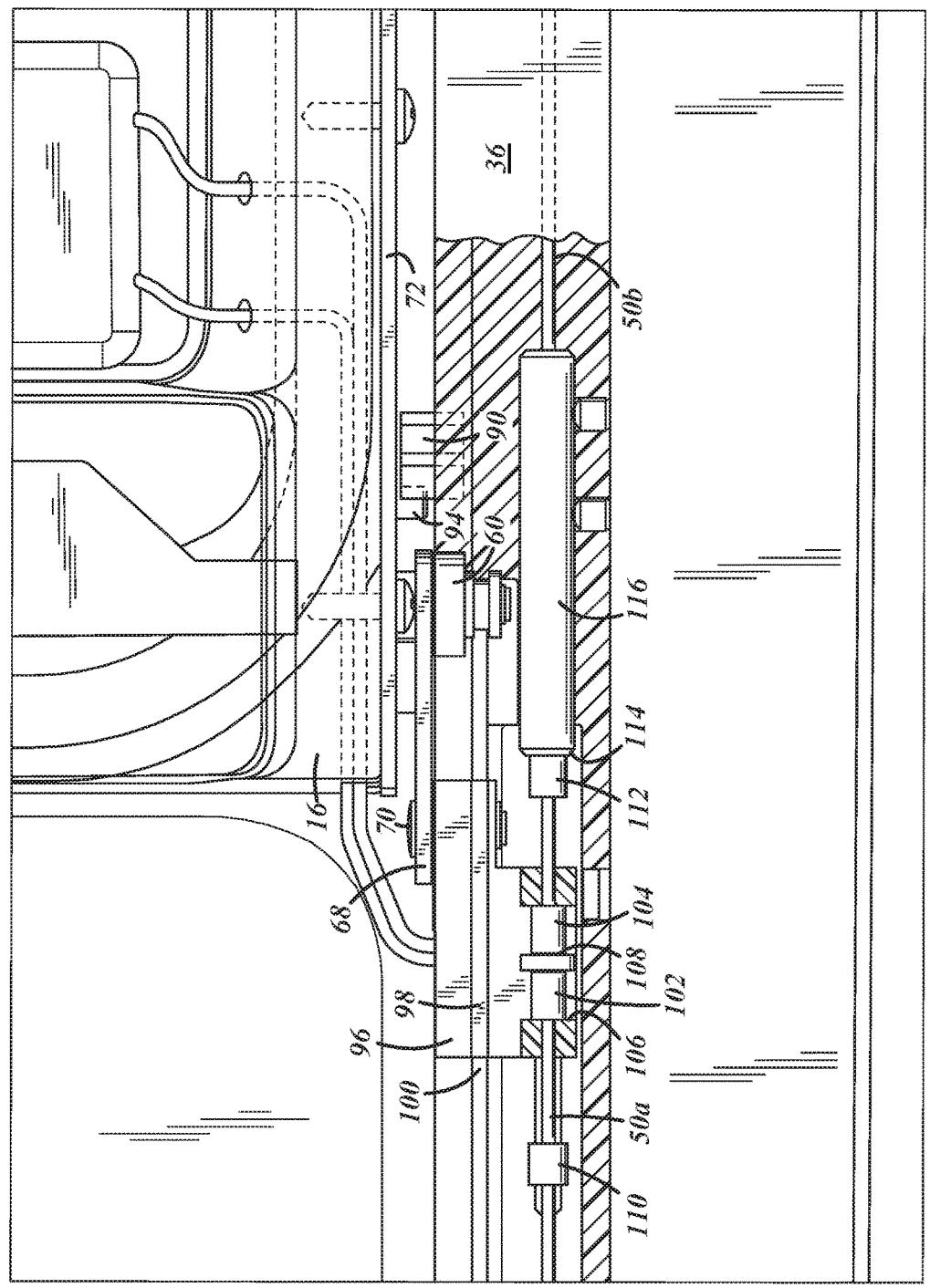
FIG. 7 is a fragmentary side view of a portion of the window assembly showing a portion of the movable window and part of the drive system used to move the movable window.
Figure 11:
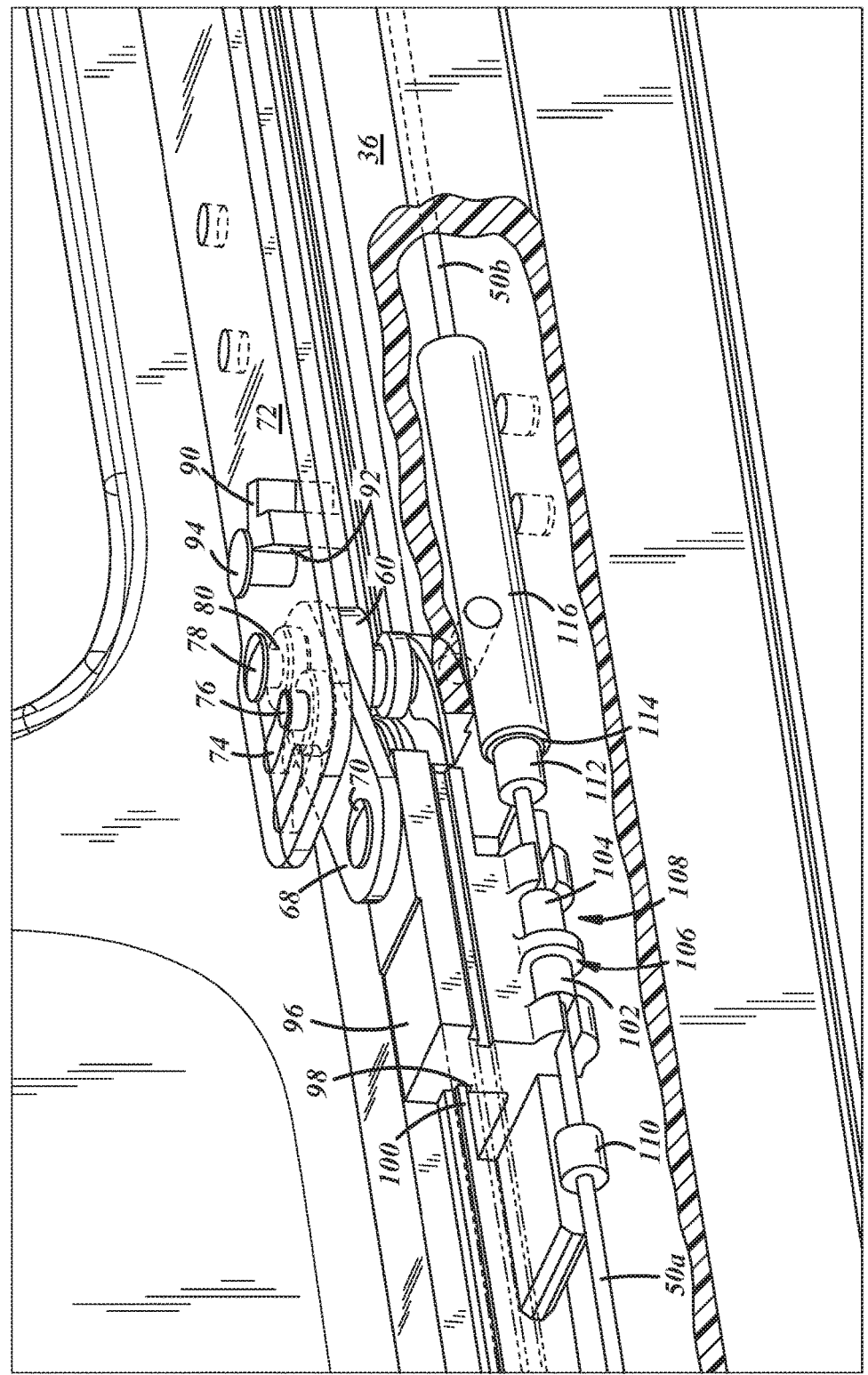
FIG. 11 is a view similar to FIG. 9, showing a drive system like FIG. 7, and a secondary cam for the movable window.

As shown in FIGS. 8 and 9, a cam follower 66 is associated with the movable window 16 and engages the cam surface 64 as the window 16 moves toward its closed position. In the implementation shown, the cam follower 66 is connected to a follower body 68 that is also connected to the guide follower 60. Of course, while shown as three components, these things can be formed all in one piece of material or in two or more pieces. Further, a pivot 70 may also be provided and it may be carried by the follower body 68 between the guide follower 60 and the cam follower 66. The pivot 70 may be moved within the guide rail 36, like the guide follower 60 as the movable window 16 moves, or the pivot 70 could be a fastener coupled to a trolley 96 that moves within the guide rail as will be discussed below. The pivot 70 may likewise be formed integrally, from the same piece of material as the follower body 68 or as a separate component, as shown. In the implementation shown, the follower body 68 is a flat metal plate to which the followers 60, 66, and pivot 70 are mounted, although the follower body 68 could have any desired shape and be formed of any desired material. FIGS. 7 and 11 show an implementation without the cam 62 or follower 66, and wherein the follower body 68 is simply pivoted on a trolley 96. An implementation could also include the cam 62, follower 66 and follower body 68 as shown in FIGS. 8 and 9.

The movable window 16 may be coupled directly to the guide follower 60 and/or follower body 68, or by a mounting plate 72, as is shown in FIGS. 7-11. The mounting plate 72 may underlie at least a portion of the window 16 and may be coupled to more than one guide follower 60 spaced along the length of the movable window 16 to provide support for the window along its length and to control and guide movement of the window. The mounting plate 72 may be pivotably coupled to the guide follower 60 and/or follower body 68. In the implementation shown, the mounting plate 72 includes a slot 74 and a pin 76 (FIG. 9) extending from the follower body 68 rides in the slot 74 to permit limited pivoted movement of the window 16 (and mounting plate 72 on which the window is mounted) relative to the follower body 68. As shown in FIG. 9, the mounting plate 72 may be coupled to the guide follower 60 by a connector 78, shown as a threaded fastener received in a threaded bore 80 in the guide follower 60. As noted above, the mounting plate is optional and is not necessary in all implementations. Of course, other constructions may be used.

As the movable window 16 nears its fully closed position, the cam follower 66 engages the cam surface 64 which pivots the follower body 68 about the pivot 70. This provides a force on the movable window 16 tending to move the window transversely and to its fully closed position (in this example, the force is conveyed to the guide follower 60 and from the guide follower 60 to the mounting plate 72 that is fixed to the window 16). The engagement of the cam follower 66 with the cam surface 64 may be more precise and consistent than the guided movement provided by the guide follower 60 within the guide rail 36 because clearance is needed between the guide follower 60 and the guide rail 36 to avoid binding or difficulty in moving the movable window 16. Further, the position of the cam 62 may be adjustable to facilitate proper placement to ensure a desired closed position of the movable window 16 and firm engagement with seals of the window assembly 10. Because the force to close the movable window 16 is provided with pivoted movement of the follower body 68, the cam follower 66 is on the opposite side of the pivot 70 as the guide follower 60. Further, the cam surface 64 is oriented with an incline in the opposite direction to the direction in which the window 16 moves into the seals.

In addition to the cam surface 64, the cam 62 may have a reaction surface 82 adjacent to the cam surface 64. The cam follower 66 may overlie or engage the reaction surface 82 when the movable window 16 is in its fully closed position. The reaction surface 82 may facilitate holding the movable window 16 in its fully closed position and may inhibit transverse movement of the movable window without a corresponding lateral movement. For example, if someone outside the vehicle were to try and push the window 16 inwardly toward the passenger compartment, the force would be applied from the window 16 to the guide follower 60 and from the guide follower 60 to the cam follower 66 via the follower body 68. The force would result in the cam follower 66 being engaged with and pushed into the reaction surface 82 which would prevent any significant movement of the cam follower 66 in that direction and in turn, prevent the attempted transverse movement of the movable window 16. This provides some resistance to forced intrusion into the passenger compartment. When the movable window 16 is to be intentionally opened, then some lateral movement also occurs and this moves the cam follower 66 out of alignment with the reaction surface 82 and into alignment with the cam surface 64 which is contoured to allow transverse movement of the window 16. The reaction surface 82 may be oriented generally parallel to the opening 18, and generally parallel to plane A shown in FIG. 2, which is to say parallel or at an acute angle to parallel sufficient to resist transverse forces on the window and to provide a desired force against the seals of the window.

Thus, the force assist member (e.g. cam 62) provides assistance to the primary guidance system which includes the guide rail 36 and cables that couple the movable window 16 to the actuator 54. The assistance may include providing an additional force holding or wedging the window 16 against the seals which is in addition to the force provided by the cables 50a, 50b that pull the window in the nonlinear guide rail section which forces the window against the seals. The force assistance may also take some of the load off of the guide follower 60 that traverses the nonlinear guide rail section by pivoting the follower 60 as the cam follower 66 engages the cam surface 64 so that the follower 60 is not the only component causing the transverse movement of the window 16. This may ease the turning of the guide follower 60 within the guide rail 36, reduce binding of the follower 60 and reduce the force needed to move the window through this section of the guide rail 36. Further, the force assist member also resists or prevents transverse movement of the window 16 when it is fully closed by way of the reaction surface 82 as noted above. The window remains engaged with the reaction surface 82 (in the example shown, this occurs through the follower member 68 and cam follower 66) until the actuator 54 moves the window via the cable 50a. In this way, the window 16 is positionally engaged or maintained in its closed position by the force of the cables 50a, 50b acting on the window, and by the force assist member.

Figure 10:
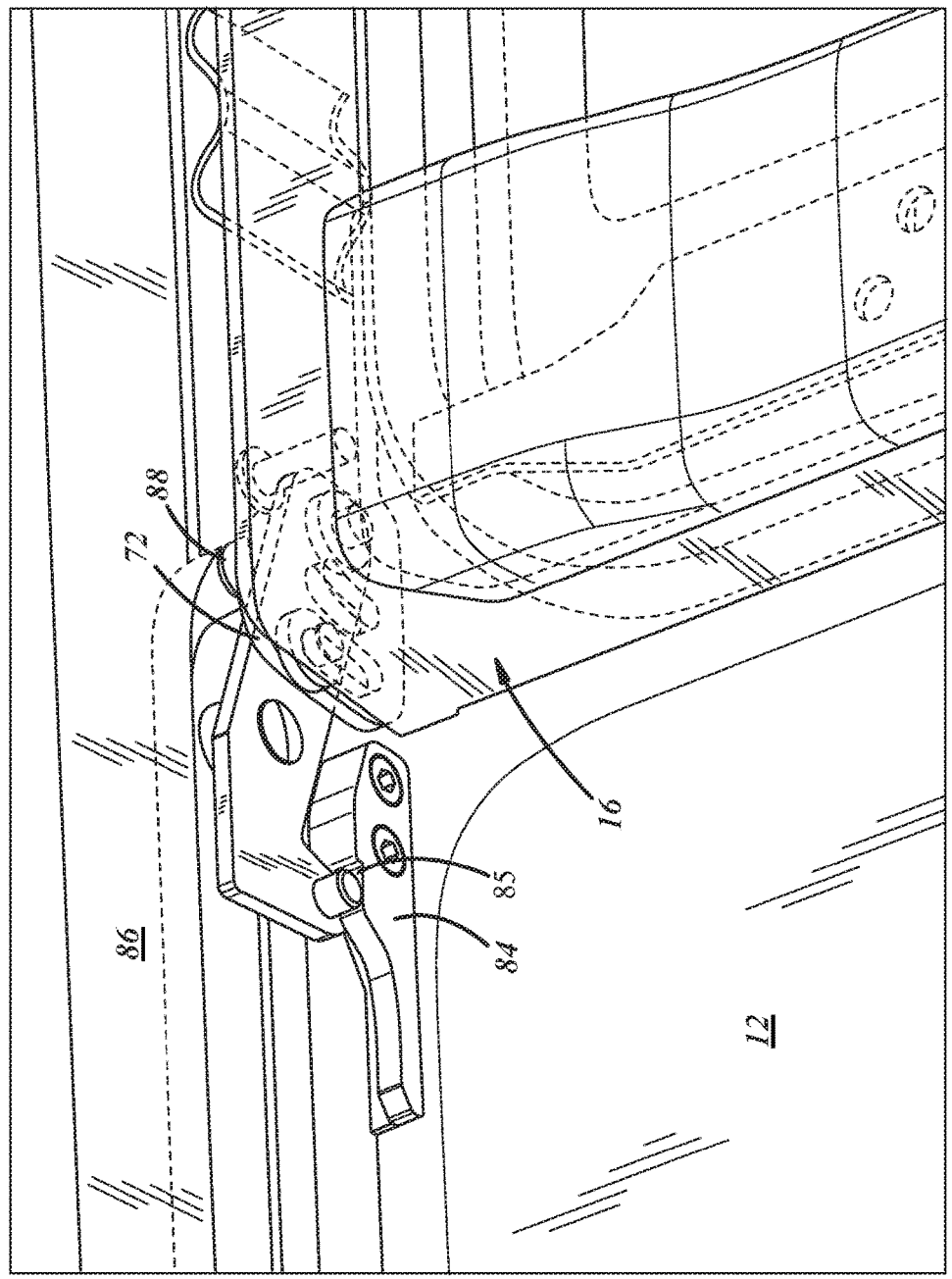
FIG. 10 is a fragmentary perspective view of a portion of the window assembly showing a portion of the movable window and a close assist cam adjacent to an upper edge of the movable window assembly.

As shown in FIG. 10, to facilitate closing and sealing the window pane, and to further inhibit forced intrusion via the window pane, a cam 84 like the cam 62 and having a reaction surface 85 may be provided adjacent to the upper portion of the window 16 as well. Because the window 16 in the implementation shown is pulled and/or pushed from only the lower end by the cables 50a, 50b and drive system 54, the window 16 may tend to tilt or cock when pulled against the seals. Without a direct force holding the upper portion of the window against the seals, the upper portion might not firmly engage and remain firmly engaged with the seals. That is, due to clearances and flexibility of some components, there may be increased play at the upper portion of the window reducing the quality of the seal, especially the upper portion of the window adjacent to the nonlinear guide rail section. Further, a force acting transversely may be able to push or move the window 16 transversely (e.g. inwardly toward the passenger compartment), such as during a forced entry or intrusion. With the cam 84 at the upper portion of the window, the upper portion of the window is forced into the seals, as noted above with regard to the lower portion of the window and cam 62. With a follower engaged with the reaction surface 85 when the window is closed, the upper portion of the window is blocked and held firm against transverse forces acting on the window, as described above with regard to reaction surface 82. The upper portion of the window 16 and assembly 10 may be constructed in similar manner, including a guide rail 86, guide follower 88, and the like. Because the upper and lower guide rails 36, 86 and window components may be similarly constructed, a further description of the upper guide rail 86 and related components is not necessary.

To help position the movable window or maintain the position of the window in its closed position, the window assembly 10 may include a secondary cam 90 (FIGS. 7 and 11). The secondary cam 90 may have a cam surface 92 oriented at an angle that also assists movement of the window 16 to its fully closed position and into the seals. The movable window 16 may include a secondary follower 94 that engages the secondary cam surface 92. The secondary follower 94 may be connected to and extend from the mounting plate 72. As with the close assist cam 62, a secondary cam 90 may be provided adjacent to both the lower and upper guide rails 36, 86, if desired. The secondary cam 90 may also help to inhibit the window from cocking or tilting within the window opening 18. Because the window 16 is pulled and/or pushed from only one end (either upper of lower) by the cables 50a, 50b and drive system 54, the window 16 may tend to tilt or cock when pulled against the seals. Engagement of the secondary follower 94 with the secondary cam surface 92 inhibits such tilting of the window 16. As shown in FIG. 11, the secondary cam surface 92 may be oriented to provide primarily transverse movement of the window pane and may be angled toward the window opening 18 to move the window 16 in that direction when the secondary follower 94 engages the secondary cam surface 92.

As noted above, the window assembly 10 may be implemented as a powered sliding window to facilitate electrically commanded opening and closing of the movable window 16. The drive system or actuator 54, which may include an electric motor, may be coupled to the movable window 16 by one or more cables 50a, 50b to move the window 16 both toward its open position and its closed position. The term cable as used here should be interpreted to mean any power transmission member driven by the drive system and coupled to the window 16 to cause movement of the window. This may include, by way of non-limiting examples, wire cables, plastic cord or other elongate members whether made of natural or synthetic materials.

In FIGS. 1, 2, 7 and 11, the window drive system utilizes two cables 50a, 50b each coupled to the window 16 and each adapted to move the window in a different direction. That is, each cable 50a, 50b may be used to pull the window 16 in a different direction. The cables 50a, 50b may be connected to anything that moves with the window 16. In the implementations shown, the cables are coupled to the follower body 68 by a trolley 96. The trolley 96 has a portion that rides in the guide rail 36 and a portion that is connected to the follower body 68 in a way that permits pivoted or other relative movement of the follower body 68 relative to the trolley 96. The trolley 96 may have a groove 98 in which a flange 100 of the guide rail 36 is received to improve the guided movement of the trolley 96 within the guide rail. The trolley 96 may slide within the guide rail and/or include rolling movement (e.g. with bearings that roll against the guide rail) or any other type of movement and is not limited to frictional sliding movement.

One cable 50a is connected to the trolley 96 to pull the trolley 96 in a first direction and the other cable 50b is connected to the trolley 96 to pull the trolley 96 in the opposite direction. The cables 50a, 50b in this implementation include stranded wire and couplers 102, 104 are fixed to the cables and engageable with the trolley 96 to couple the cables to the trolley 96. The couplers 102, 104 may include annular beads through which the cables 50a, 50b extend and which may be crimped or otherwise coupled to the cables to prevent relative movement between them. The beads 102, 104 may be received in complementary pockets 106, 108 in the trolley 96 to facilitate connection to the trolley 96.

In addition, stops 110, 112 may be provided on or otherwise associated with the cables 50a, 50b. The stops 110, 112 may be spaced from the trolley 96 and couplers 102, 104, and designed to engage stop surfaces 114 (only one stop surface is shown in FIGS. 7 and 11, and it is engaged by stop 112) of the window assembly or other component to limit movement of the movable window 16 in both directions. The stops 110, 112 may also be annular members crimped or otherwise connected on the cables 50a, 50b. Upon engagement with a stop surface 114, the stops 110, 112 take up or experience most of the force of the engagement, reducing the load on the trolley 96 to prevent damage thereto. To facilitate adjustment of the fully closed position of the window 16, the stop surface 114 engaged by the stop 110 may be adjustable.

In the implementation shown, the stop surface 114 may be connected to the guide rail 36 and movable relative to the cable 50a. The stop surface 114 as shown is defined by an end of a tubular body 116 and the cable 50a extends through the body 116 to ensure that the stop 112 engages the stop surface 114 and misalignment or becoming separated from each other are not issues. The window assembly 10 may be provided as a self-contained unit, with the panes 12, 14, 16 and supporting members (e.g. guide rail(s) 36, 86 and/or frame) integrated into a single unit. Before or after installation of the unitized assembly into a vehicle, the window 16 may be moved to a desired fully closed position and the body 116 may be positioned and secured as desired, so that the stop 112 engages the stop surface 114 when the movable window is fully closed. The fully open position could be set in the same manner, if desired. In one implementation, set screws or other connectors are used to connect the body 116 to the guide rail 36 while permitting initial adjustment of the position of the body.

In another implementation shown in FIGS. 8 and 9, a single cable 120 is connected to the movable window 16 and is operable to move the window in both directions between its open and closed positions. That is, the cable 120 both pushes and pulls the window 16 within the guide rail 36.

In this implementation, the cable 120 may include an outer casing 122 (FIG. 9) and an inner core 124 received within the outer casing. The outer casing 122 limits bending of the core 124 so that the core, which is flexible so that it may bend around corners and the like, may be made stiff enough to push the window 16. To improve the stiffness of the core 124 in the pushing direction, the core may include a support 126 or the core may be coiled, and for example, helical. In at least some implementations, the core 124 may include both a straight inner cable 128 and a support 126 that is wound or wrapped about the inner cable 128. The support 126 may be helical or otherwise shaped and arranged and may provide a relatively close fit within the outer casing 122 to further limit bunching or bending of the core 124 within the casing 122. The limitation on bending of the core 124 within the casing 122 makes the core stiffer so that it may push the window 16. The substantially inextensible core 124 also pulls the window 16 in the same fashion as described above.

To couple the core 124 to the trolley 130, two stops 132, 134 may be connected to the core 124 and each stop 132, 134 may engage an oppositely facing stop surface 136 of the trolley 130. The stops 132, 134 may be provided tight against the trolley 130 to reduce or eliminate slop or play in the system, as desired. Further, the trolley 130 may include a passage 140 or bore through which the inner cable 128 extends with the stops 132, 134 positioned against the trolley 130 at the ends of the passage 140. This maintains the core 124 aligned with and coupled to the trolley 130 for a robust and coaxially aligned connection for improved movement of the trolley 130 within the guide rail 36.

Figure 12:
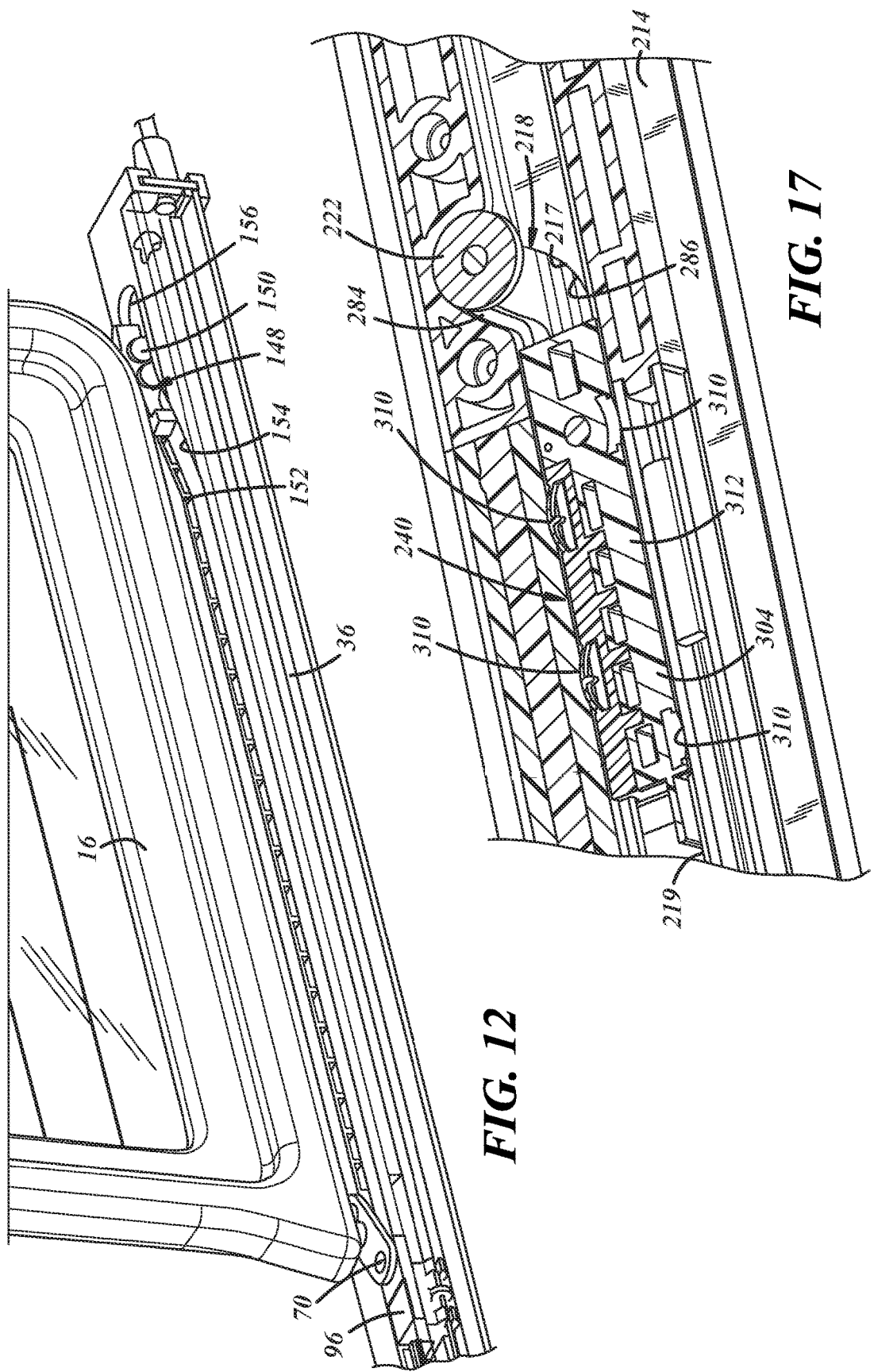
FIG. 12 is a fragmentary perspective view of a portion of the movable window and guide rail.

As shown in FIG. 12, a follower or guide pin or the like that is responsive to the contour of the guide rail 36 (including but not limited to a track or channel formed in the guide rail) may be associated with a sled 148 that may have a biasing member 150. The biasing member 150 may engage one or both side walls 152, 154 of the track 156 in the guide rail 36 to reduce vibrations or rattling of the window assembly. The biasing member 150 may be comprised of all or a portion of the sled 148, and the sled may slide or ride in the track 156 and assist in guiding the movable window 16 within the track 156. The sled 148 may be formed in one piece or more than one piece and may be flexible to permit the sled to navigate bends in the track 156 and resilient to engage the spaced apart sidewalls 152, 154 of the track 156 to prevent the window 16 or a follower (like follower 60) from rattling around against the guide rail 36 or within the track 156.

Figure 13:
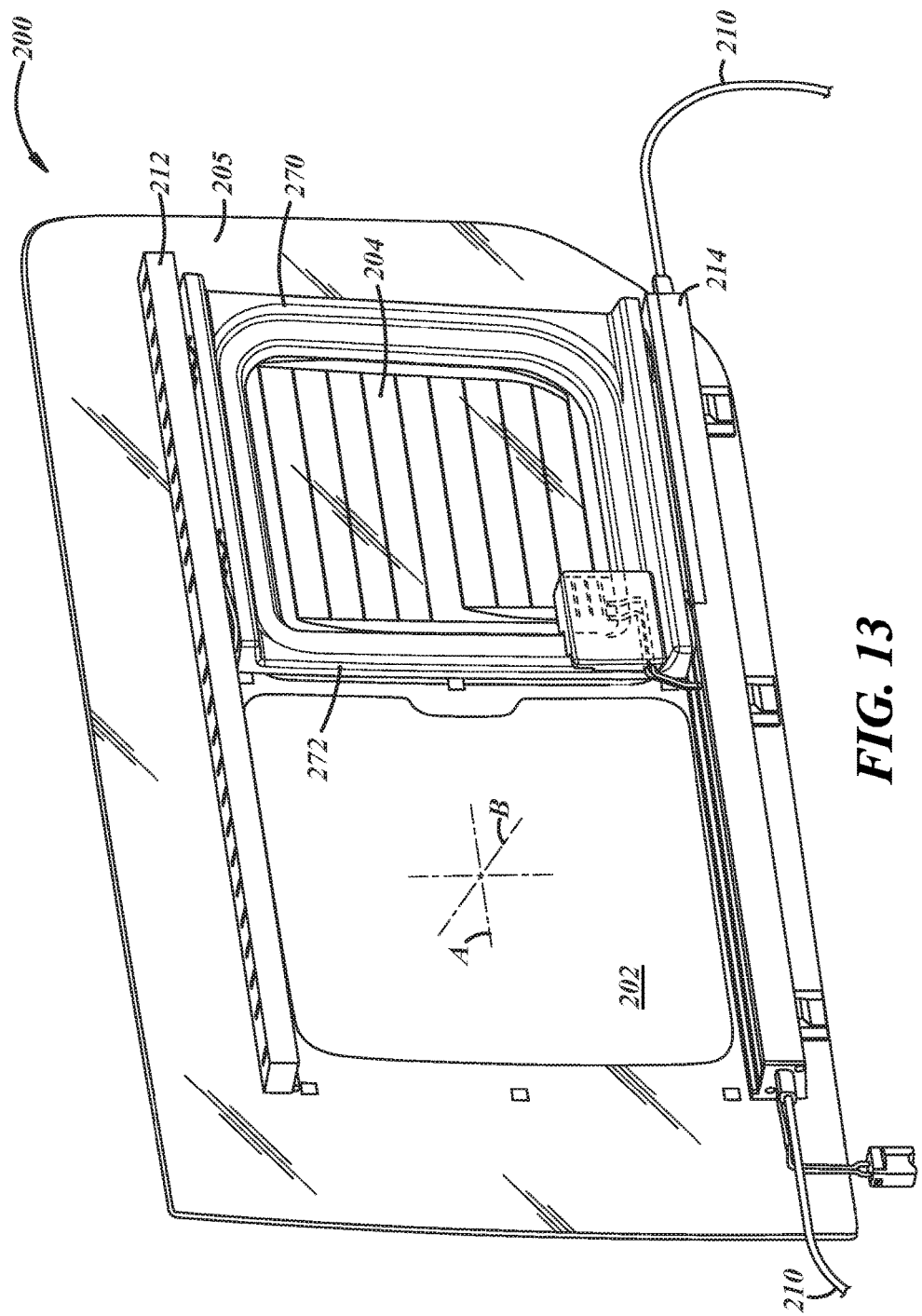
FIGS. 13 and 14 are perspective views of a window assembly having a fixed pane and a movable pane that moves relative to an opening to selectively close or cover the opening.
Figure 14:
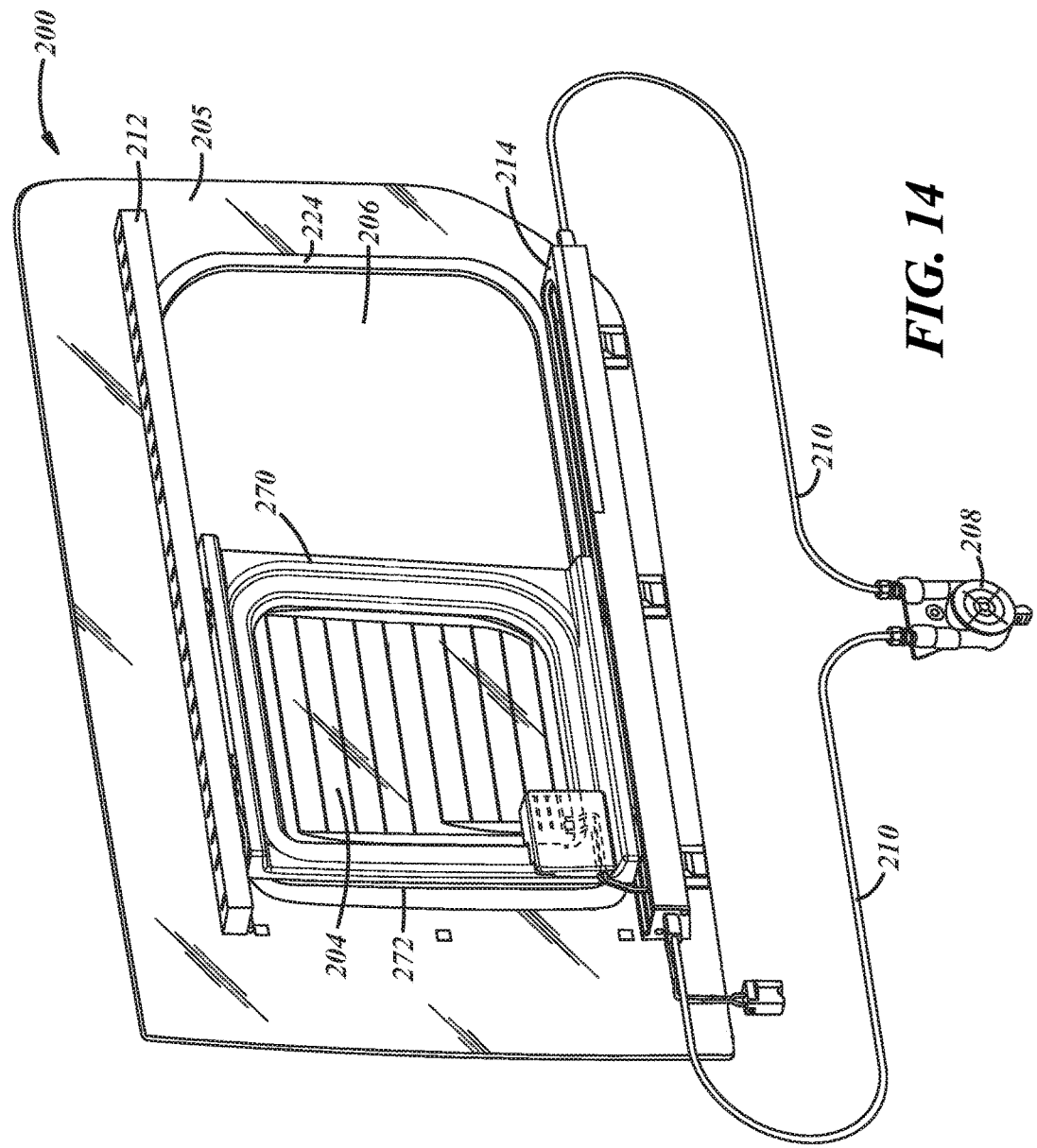

FIGS. 13 and 14 illustrate one implementation of a window assembly 200 having a fixed pane 202, a movable pane 204 and a frame or surrounding exterior component 205 formed of glass or any desired material. While shown with only one fixed pane 202, more than one fixed pane may be included. The window assembly 200 may be used as a rear window for a pick-up truck passenger compartment. The window assembly 200 may be a frameless, one-piece backlight of a pickup truck, or any other suitable type of window assembly including, but not limited to, a backlight having a frame carrying one or more fixed panes.

In at least some forms, the window assembly 200 includes an opening 206 and the movable window or pane 204 that is moved relative to the opening. The movable pane 204 may have a closed position wherein the movable pane fully overlaps, covers or closes the opening 206 to inhibit or prevent wind and water passing through the opening, and an open position wherein the movable pane is moved from its closed position and only partially overlaps or does not overlap the opening at all. As shown in FIG. 14, the movable pane 204 may be moved in any suitable manner by any suitable means, including but not limited to the actuator 208 and actuator cable(s) 210 which may be as described with regard to the window assemblies previously described herein.

As shown in FIGS. 13 and 14, the window assembly 200 may include both an upper guide rail 212 and a lower guide rail 214. Each guide rail 212, 214 may include a contoured guide track 216, 218 (see e.g. FIG. 18 for the upper guide track 216 and FIGS. 15-17 for the lower guide track 218). Components coupled with the movable pane 204 are received in or adjacent to the guide tracks 216, 218 to control the path of travel of the movable pane between its closed and fully open positions. As in the previously described window assembly, the guide tracks 216, 218 may define and the movable pane 204 may move along a contoured path providing a so-called flush sliding window assembly. When the movable pane 204 is moved away from its closed position, the movable pane 204 must move either inwardly toward or outwardly away from the passenger compartment before or as the movable pane 204 is moved laterally to uncover at least part of the opening 206.

To provide this compound movement of the movable pane 204, the guide tracks have at least a portion 217 (FIGS. 15 and 17) that is not linear or straight and is curved and a second, straight portion 219 extending from the curved portion 217. The compound movement of the movable pane 204 has a first component generally perpendicular to a plane including the fixed pane 202 (called "transverse" herein and generally along line or plane B in FIG. 13) and a second component generally parallel to that plane (called "lateral" herein and generally along line or plane A in FIG. 13). While the terms "plane" and "planar" are used herein, it is recognized that the fixed pane 202 and/or the movable pane 204 may have some curvature, that is, they might not be flat or planar. Nonetheless, they may be considered to be in the same general alignment or plane in the closed position shown in FIG. 13 even if they are not entirely within any given plane. This compound movement both moves the movable pane 204 transversely out of plane with the fixed pane 202 and also laterally relative to the fixed panes 202. To control this compound movement, upper and lower guide followers 220, 222 that are coupled to the movable pane 204 ride along the guide tracks 216, 218 to provide a desired path of motion for the movable pane.

As so far described, the window assembly 200 may be considered to be similar to the window assembly 10 previously described. Further, the window assembly 200 may include many of the same or similar components described above with regard to the window assembly 10. For the most part, description of the components in window assembly 200 that are common to or similar as components in window assembly 10 will be limited to or focused upon the differences in the components to reduce repetitive descriptions.

In the closed position of the movable pane 204, the window engages seals 224 (shown diagrammatically in FIG. 14) to provide a substantially air and water tight interface to prevent or greatly inhibit air and water intrusion into the passenger compartment around the movable window. If the seals 224 are not sufficiently engaged, wind noise may be elevated and/or water may enter the passenger compartment. To assist in fully closing the movable pane 204, a force assist member 226 may be provided.

Figure 15:
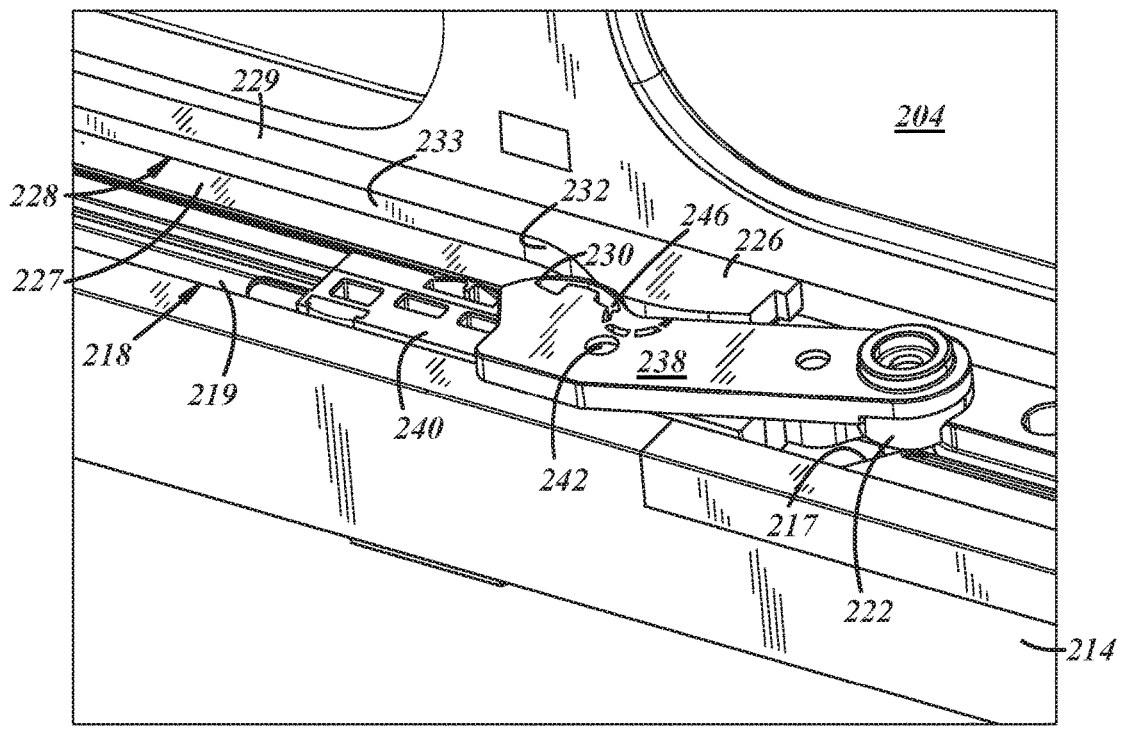
FIG. 15 is a perspective view of a portion of a lower guide track with the movable pane removed to better show a guide follower, follower body and trolley that move with the movable pane, the components being shown in positions they are in when the movable pane in its closed position.

As shown in FIG. 15, force assist member may include a cam 226 having a cam surface 228 adapted to be engaged by a cam follower 230 associated with the movable pane 204. The cam may include an elongate body coupled to the guide rail, preferably outboard of the guide track 218. The cam surface 228 may face transversely toward the guide track 218, and have a width extending from an upper surface 227 of the guide rail 214 to an upper surface 229 of the cam 226. Like the cam surface 64 of cam 62, the cam surface 228 of this cam 226 may include an inclined or curved portion 232 that is arranged to help guide or steer the movable pane 204 when the movable pane is near its closed position, and to help laterally displace or pivot the movable pane 204 into its closed position engaged with the seals 224. The cam surface 228 in this implementation also includes a linear or straight portion 233 that may extend a length equal to at least a majority of the length of the travel path of the movable pane 204 and up to the entire length of the travel path. The cam surface 228 may generally mimic the shape of the guide track 218, and in the implementation shown wherein the movable pane 204 moves in a generally straight line after initial opening movement of the movable pane, the cam surface 228 may be generally linear other than in the curved portion 232. So in this implementation, the cam surface 228 is arranged to be engaged by a cam follower 230 even along a flat or not transversely contoured section of the cam surface 228.

In use, as the movable pane 204 is moved toward and away from its closed position, the cam follower 230 engages the cam surface 228. This provides guidance for the movable pane 204 in addition to the guide followers 220, 222 and any sleds 234, 236 (FIGS. 20 and 21) within the guide tracks 216, 218. The engagement of the cam follower 230 with the cam surface 228 over a longer portion of the travel path may also transversely bias the movable pane 204 and associated components relative to the guide tracks 216, 218 (e.g. toward one side surface of the guide track) and reduce vibrations and noise in the window assembly 200.

Figure 24:
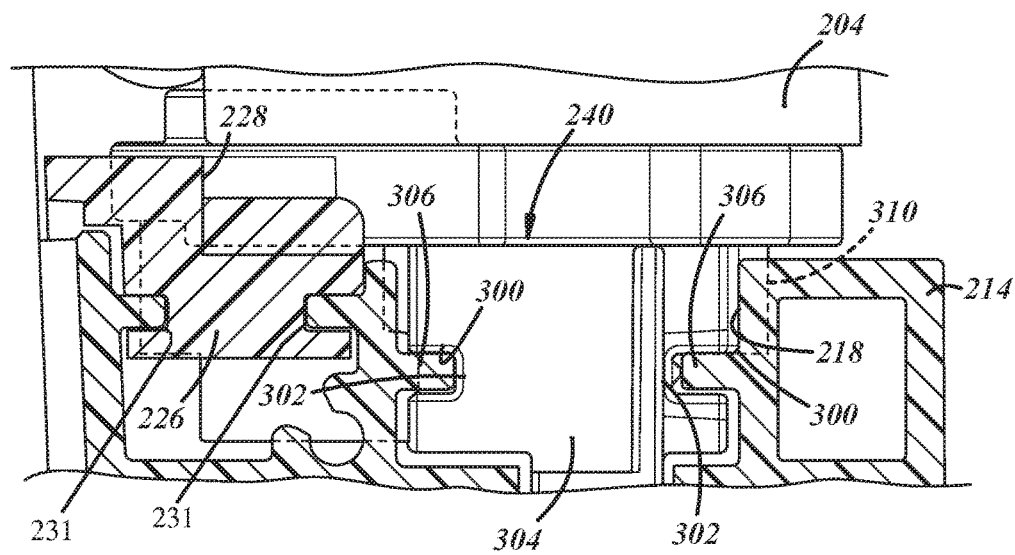
FIG. 24 is a fragmentary sectional view of a portion of the lower guide rail, cam and trolley.

The cam 226 may be integrally formed in the guide rail 214 (e.g. as a surface of the guide rail when the guide rail is extruded) or the cam 226 may be a separate component carried by the guide rail. As shown in FIG. 24, the cam 226 and guide rail 214 may include complementary flanges and slots (both shown at 231) to retain the cam on the guide rail. The cam 226 may be slid into place from an end of the guide rail 214 after the guide rail is formed. When the cam 226 is not integral with the guide rail 214, the same guide rail construction can be used with different cams to reduce the number of parts needed across a range of different window assemblies 200.

In the implementation shown, the follower body 238 includes or carries the cam follower 230 and is coupled to the lower guide follower 222 at a location spaced from the cam follower 230. When the guide follower 222 is within the straight portion 219 of the guide track 218 (i.e. the guide follower 222 has moved beyond the curved portion 217 of the guide track), the cam follower 230 is engaged with the cam surface 228. Hence, the cam follower 230 is engaged with the cam surface 228 during some portion of the linear, lateral travel of the movable pane 204, and the corresponding linear portion 233 of the cam surface 228 is at least equal to the length of the follower body 238.

Figure 16:
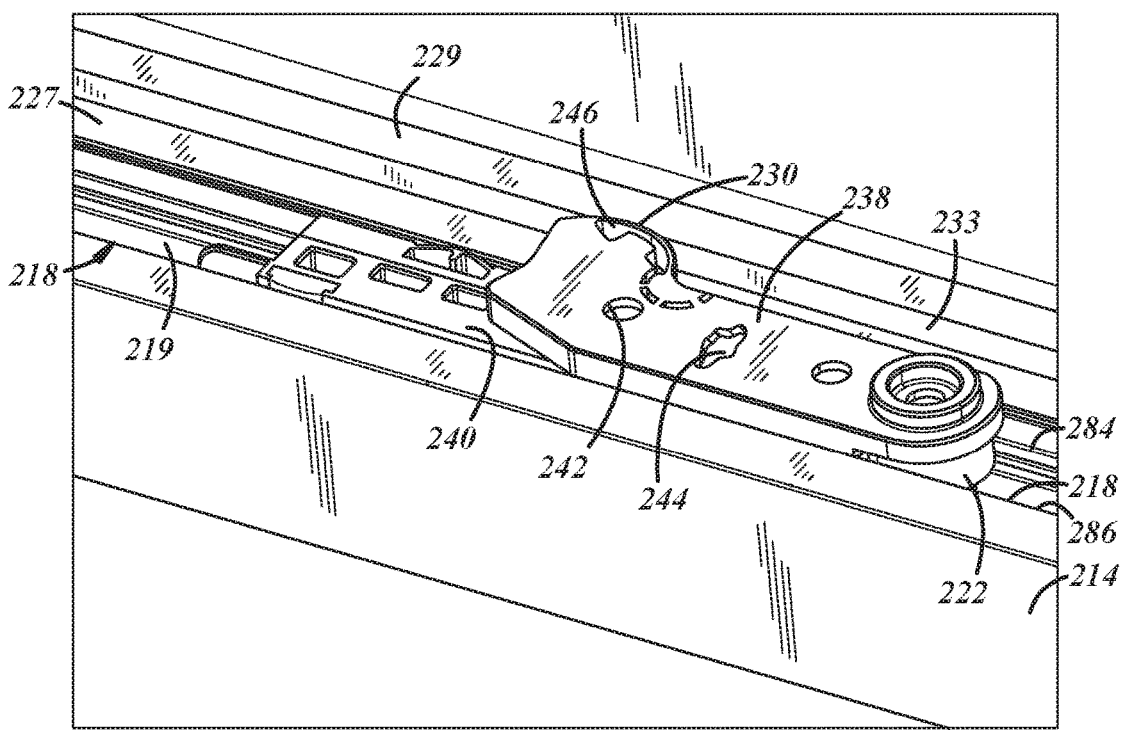
FIG. 16 is a view similar to FIG. 15 but showing the components in positions they are in when the movable pan is moved away from its closed position and at least partially open.

Next, as shown in FIGS. 15 and 16, the follower body 238 may be coupled to a trolley 240 at a pivot 242, as described in the prior window assembly 10. The pivot 242 may be located between the cam follower 230 and the guide follower 222. The cam follower 230 may be integrated with the follower body 238, such as by being defined by a surface of the follower body that generally faces the cam surface 228. In the implementation shown, the follower body 238 includes a support plate 244 that is overmolded with an outer layer or material in one or more locations (see FIG. 16 wherein a portion of the polymeric material has been removed to show the support plate 244). The outer layer may be formed of a polymeric material and provide the surface of the cam follower 230 that engages the cam surface 228. The polymeric material may be chosen to be durable and provide a reduced friction interface for smooth sliding engagement of the cam follower 230 with the cam surface 228. The cam follower 230 may be flexible, that is, the engagement surface may yield or give slightly to facilitate movement of the movable pane with less force and less chance of binding. Flexing of the cam follower 230 may also help damp vibration between the movable pane 204 and the guide rail 214 and cam 226. A biasing member, such as a spring, may act on the follower body 238 to provide the force holding the cam follower 230 against the cam surface 228. Or, the cam surface 228, pivot 242 of the follower body and cam follower 230 can be arranged so that movement of the follower body 238 relative to the cam surface is constrained to maintain engagement of the cam follower with the cam surface. That is, the follower body 238, which is coupled to the movable pane 204 and to the trolley 240, is not free to pivot or otherwise move away from the cam surface 228 by a distance that would permit the cam follower 230 to disengage from the cam surface.

In the implementation shown, one or more voids 246 (e.g. slots, openings or gaps) are provided between the main portion of the follower body 238 and the cam follower 230 so that the cam follower may flex or deform transversely, preferably elastically and without significant permanent deformation so that the cam follower 230 can resiliently return to or toward its original shape when the force on it is reduced. The material defining the cam follower may be coupled to the main body at one or both ends. When connected at one end, the void is not fully enclosed between the main body and cam follower, and the cam follower may be cantilevered from the main body. When connected at both ends, as in the implementation shown in the drawings, the void is enclosed between the main body and cam follower. Of course, no void is necessary and the cam follower need not be flexible or resilient, instead, if desired, a separate biasing mechanism can be provided, such as on acting on the follower body.

Figure 18:
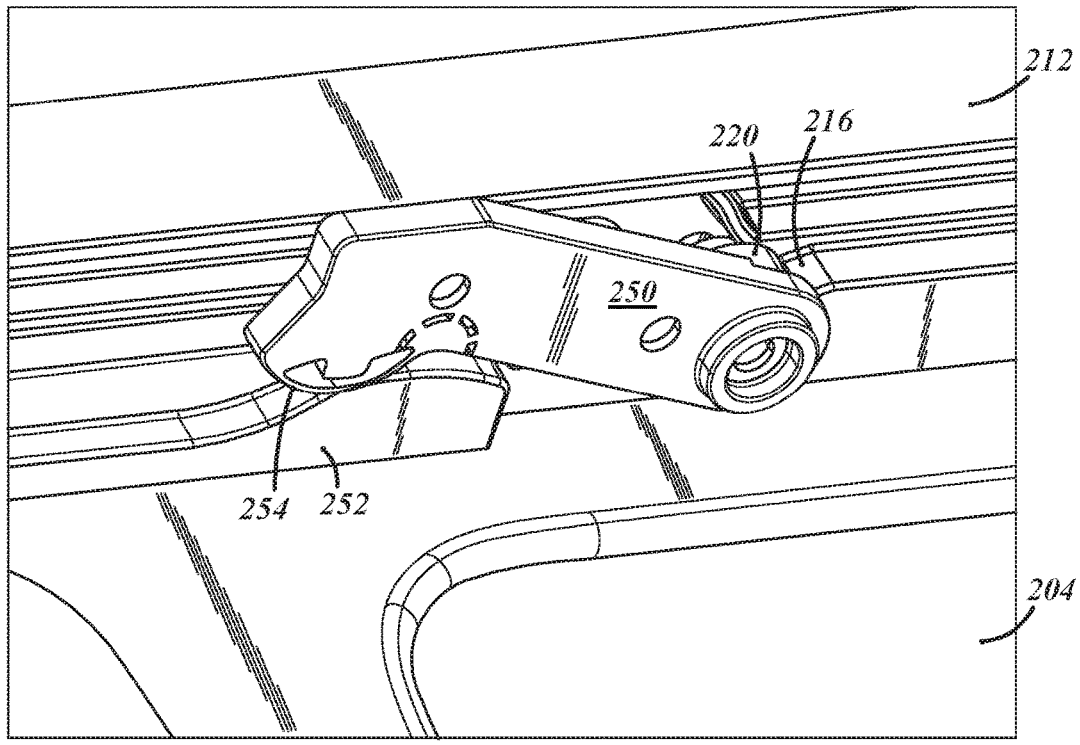
FIG. 18 is a perspective view showing a portion of an upper guide track with the movable pane removed to show a follower body and guide follower associated with the upper guide track.

FIG. 18 illustrates the upper guide rail 212 and associated follower body 250 and guide follower 220 to which an upper side of the movable pane 204 is coupled, and also a force assist member 252 (e.g. an upper cam) associated with the upper guide rail 212. These components may be constructed and arranged in the same manner as set forth with regard to the follower body 238, guide follower 222 and force assist member 226 associated with the lower guide rail 214. The upper cam 252 may extend along the linear portion of the upper guide track 216, and the cam follower 254 may be arranged to stay in contact with the cam 252 along most or all of the length of the upper cam 252, which may coincide with the length of the lower cam 226. This may maintain a desired alignment of the movable pane 204 relative to the guide rails 212, 214 and reduce noise and vibrations.

Figure 19:
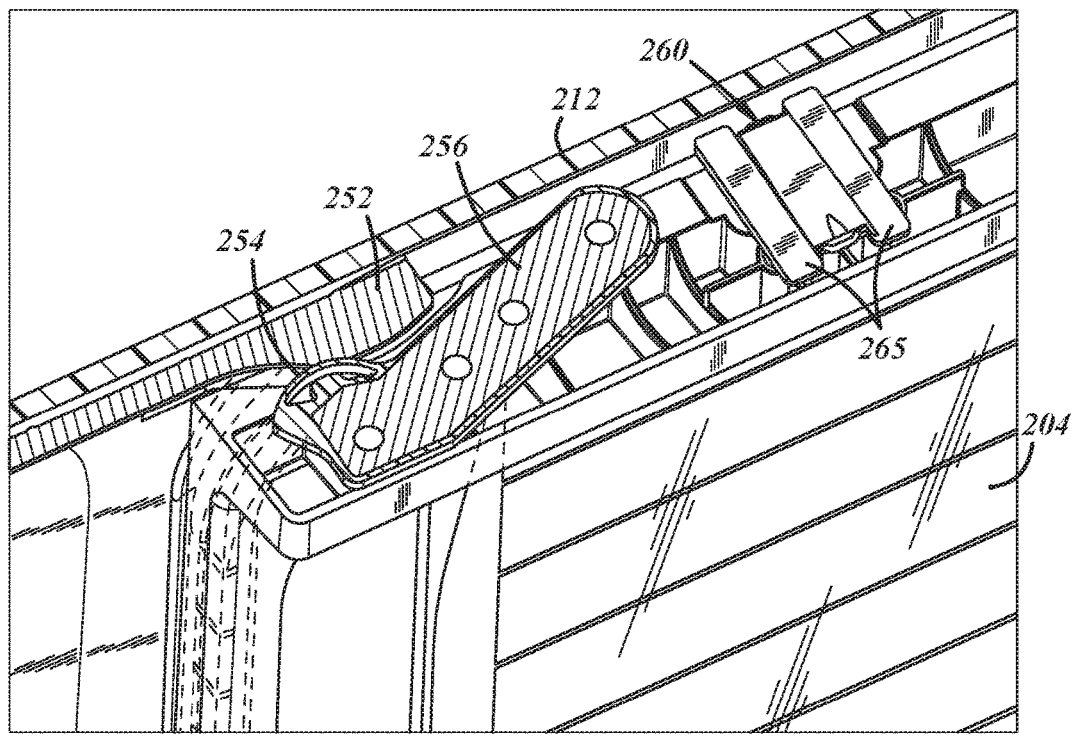
FIG. 19 is a sectional view similar to FIG. 18 and showing the follower body and other components associated with the upper guide track.

FIG. 19 shows the support plate 256 of the follower body 250, and the overmolded cam follower 254. In this implementation, most if not all of the exterior of the follower body 250 is overmolded with the polymeric material, which also defines the cam follower 254. The lower follower body 238 may be formed the same way, as already described.

FIGS. 19 and 20 also show biasing members 260 associated with the movable pane 204, of which one or more may be provided. The biasing members 260 may be received between the movable pane 204 and the upper guide rail 212, and provide a yieldable biasing force on the movable pane, which tends to move the movable pane away from the upper guide rail and onto the lower guide rail 214. This may reduce vibration, such as by reducing movement of the movable pane 204 relative to the guide rails 212, 214 and may also maintain the movable pane in a desired attitude or alignment relative to the guide rails.

The biasing members 260 may include a spring body 262 coupled to the movable pane 204 (such as by a fastener extending into a peripheral frame of the movable pane) and a gliding member 264 received between the spring body 262 and the upper guide rail 212. The gliding member 264 may be made of a polymeric material (e.g. acetal) that is durable and provides relatively low friction against the guide rail 212 so that the biasing members move smoothly along the guide rail as the movable pane moves. The biasing members 264 may include two pads or contact surfaces 265 that are laterally spaced apart, and have a transverse length sufficient to span the guide track 216 and overly and engage the guide rail 212 on opposites sides of the guide track 216. The gliding member 264 may also provide some spring or biasing force on the movable pane 204, or it may simple respond to the force provided by the resilient spring body 262. In the implementation shown, two biasing members 260 are provided laterally spaced apart with one adjacent to each of the leading 270 and trailing edges 272 of the movable pane 204 to provide a balanced force on the movable pane and inhibit tilting of the movable pane.

FIG. 21 illustrates one implementation of a sled 234 that may be received within the lower guide track 218 and to which the movable pane 204 is coupled. A similar sled 236 may be provided in the upper guide track 216. The sleds 234, 236 slide within the tracks 216, 218 and help to guide the movable pane 204 as it moves between the open and closed positions. To facilitate motion of the sleds 234, 236 relative to the guide track 216, 218, the sleds may be formed of a material that provides relatively low frictional resistance when moved along the guide tracks. The material may be metal, plastic, a composite, or a metal body overmolded at least partially with plastic, for example, plastic portions may be provided where the sleds 234, 236 may engage the guide rail 214 to reduce friction at those locations. The sleds 234 in the lower guide track 218 may be spaced apart from the trolley 240 and guide follower 222 providing two spaced apart points to provide balanced support for the movable pane. The sled 234 may include a main body 274 with an opening 276 that receives a pin carried by the movable window 204 (e.g. extending from the frame of the movable pane 204), and at least one biasing member 278. The opening 276 may be received in a head 280, and the head may overlap an upper surface 227 of the guide rail 214 and extend at least partially out of the guide track 218.

In the implementations shown, at least one biasing member 278 is provided on opposed sides of the sled 234, with one biasing member adjacent to and adapted to engage each of the opposed sides 284, 286 of the guide track 218. The biasing members 278 are yieldable and flexible to help the sled 234 navigate the curved portion 217 of the guide track 218, and provide a force tending to bias the sled 234 generally transversely. As shown, the biasing members 278 include thinner sections of the sled, with one biasing member defined by a strip of material located outboard of an opening 288 or slot in the main body, and others defined by cantilevered fingers extending from the main body. Of course, other biasing members may be used. The biasing members 278 flex to temporarily reduce a transverse width of the sled 234 as the sled navigates a corner or bend in the guide track 218. With at least one biasing member 278 engaged with the guide rail 214, the sled 234 may engage the guide rail 214 in at least two locations and vibrations may be reduced as the sled is less likely to rattle or vibrate relative to the guide rail than if the sled were more loosely received within and not biased against the guide rail 214.

FIGS. 17 and 22-24 illustrate one implementation of a trolley 240 that is coupled to the movable pane 204 and moves within the lower guide rail 214 as the movable pane moves. Among other things, the trolley 240 may help support and guide the movable pane 204, and may be coupled to the actuator 208 via one or more cables 210 that drive the movable pane 204 between its open and closed positions, as described with regard to the window assembly 10.

Figure 22:
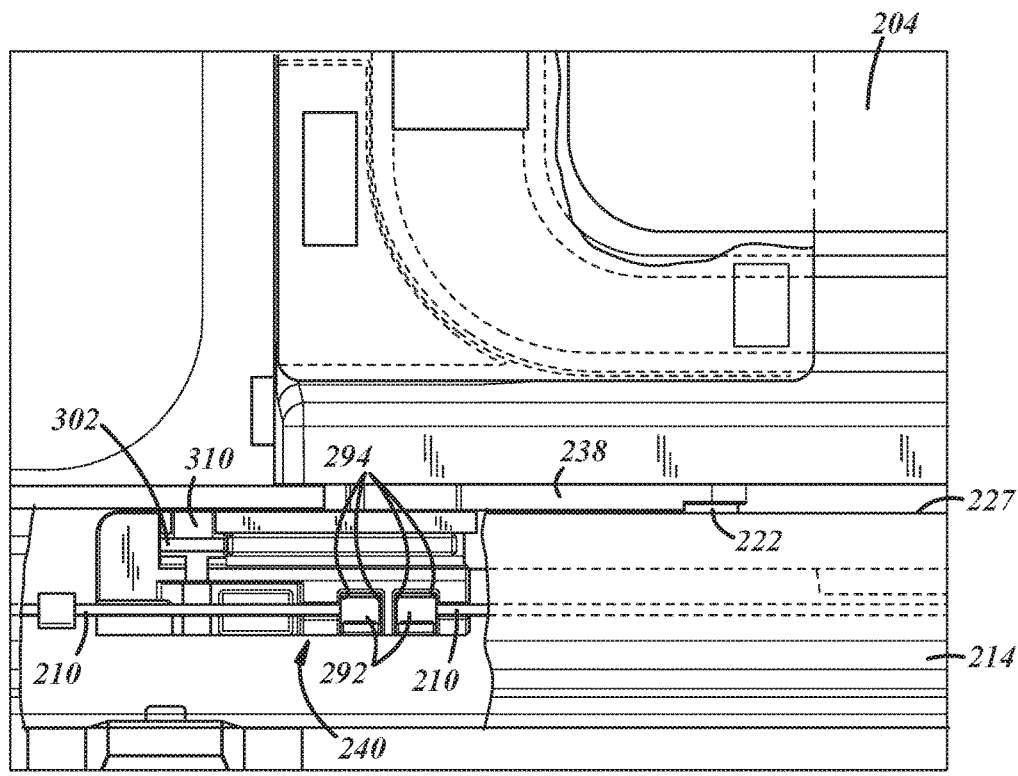
FIG. 22 is a front view of a portion of the lower guide track and movable pane showing the trolley and a portion of a defrost assembly.
Figure 23:
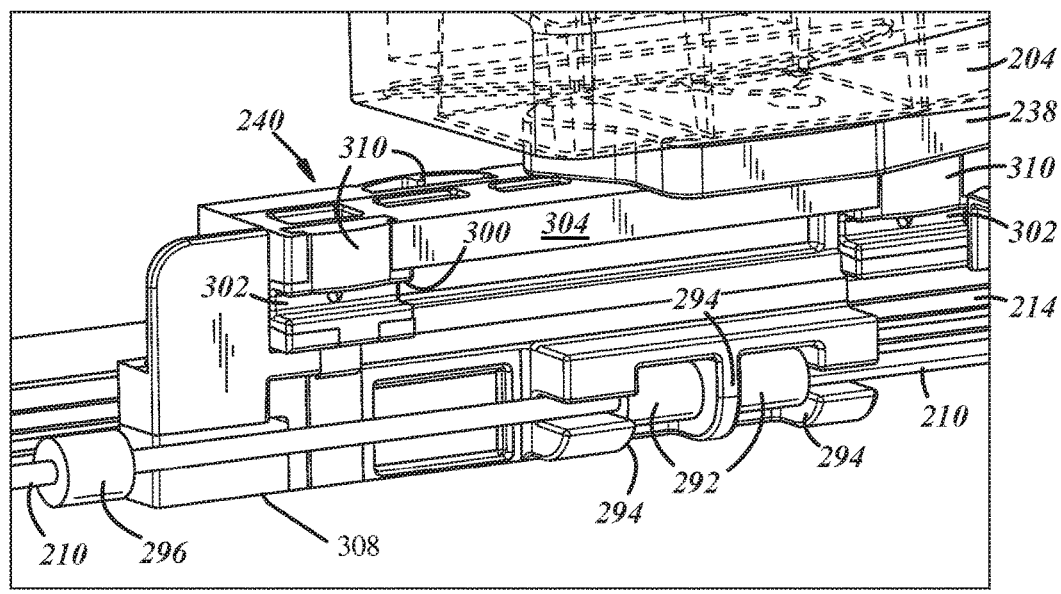
FIG. 23 is a perspective view of the trolley.

With regard to the actuator 208 and cables 210 for driving the movable pane 204 to and between its open and closed positions, the trolley 240 may be constructed and arranged the same as or similar to the trolley 96 of window assembly 10. As shown in FIGS. 22 and 23, beads or other stops 292 on the cable 210 may be associated with opposing stop surfaces 294 on the trolley 240 to enable the trolley to be pulled and/or pushed in two opposed directions to move the movable pane 204 between its open and closed positions. If desired, end stops 296 may be provided on or otherwise associated with the cable 210 separately from the trolley 240. These end stops 296 may limit the movement of the movable pane 204 by engaging stop surfaces at the ends of the travel path as previously described, and may be adjustable if desired, for improved control on the position of the ends of the travel path.

As the trolley 240 and movable pane 204 (which is coupled to the trolley as noted above) are driven by the actuator 208 and cables 210, the guide follower 222, sled 234 and trolley 240 move within the lower guide track 218, and follower 220 and sled 236 move within the upper guide track 216, so that the movement of the movable pane 204 is controlled along the predetermined travel path. The trolley 240 is spaced from the guide follower 222, and in at least some implementations, does not move through the transversely curved portion 217 of the lower guide track 218 and instead remains in the straight, laterally extending portion. In this way, the trolley 240 can be elongated and provide bearing surfaces 300 for smooth movement of the movable pane 204. In the implementation shown, the bearing surfaces 300 include or are surfaces within in slots or grooves 302 formed in the trolley main body 304, as shown in FIGS. 22-24. Multiple discrete bearing surfaces 300 may be provided spaced along the trolley body 304, on opposed sides of the body.

The grooves 302 may receive inwardly extending flanges 306 (FIG. 24) of the guide rail 214, preferably located beneath the upper surface 227 of the guide rail 214 and within the guide track 218 so that the flanges are spaced from the movable pane 204. The flanges 306 may be formed in one piece with the guide rail 214, such as by forming the guide rail by extrusion. The trolley body 304 may be supported on the flanges 306 so that a lower surface 308 of the trolley body 304 does not engage or drag against the guide rail 214. In this way, the trolley body 304 may be considered to hang on the flanges 306 at bearing surfaces 300 defined in the upper surface of the grooves 302. To further reduce friction, the surface area of the grooves 302 may be made relatively small so that the trolley body 304 engages the flanges 306 over a limited surface area. In at least some implementations, the bearing surfaces 300 comprise less than 25% of the length of the trolley body 304. The lower surfaces of the grooves 302 may overlap a lower edge of the flange 306 to restrain upward movement of the trolley body 304.

Inner surfaces of the grooves 302 may limit movement of the trolley body 304 transversely relative to the flanges 306, and biasing members 310 may also be provided to control transverse movement of the trolley 240 and damp vibrations that might otherwise propagate between the trolley and guide rail 214. In the implementation shown, multiple biasing members 310 are carried by the trolley 240 and extend transversely outwardly toward and into engagement with the oppositely facing surfaces 284, 286 of the guide track 218. The biasing members 310 may be integrally formed in one piece with the trolley body 304 to limit the number of pieces in the assembly and reduce assembly time. The biasing members 310 may include flexible and resilient strips of material and/or resilient cantilevered fingers as described with reference to the sled 234, or any other arrangement of a flexible and resilient component or surface. In at least some implementations, at least one biasing member 310 may remain in contact with the guide rail 214 throughout the range of motion of the movable pane 204. This may inhibit rapid movement of the trolley 240 toward or away from surfaces 284, 286 of the guide track 218 and thereby reduce vibrations or rattling of the trolley relative to the guide rail.

In at least some implementations, as shown in FIG. 17, the trolley body 304 may include a base 312 formed of a first material and a second portion of a second material, which may be bonded (nonlimiting examples include overmolding, weld or adhesive), mechanically coupled or otherwise connected to the base 312. The base 312 may be coupled to the cables 210 and hence, should be made from a material that can handle the forces and stresses associated therewith. In the implementations shown, the base is formed from a reinforced plastic (e.g. glass-filled nylon) or a metal, such as aluminum. The overmolded material may be arranged to engage the guide rail 214, such as by defining the biasing members 310 and bearing surfaces 300, and so the second material may be chosen to provide a desired reduced frictional engagement with the guide rail. In the implementation shown, the second material is acetal although other polymers, composites or a metal may be used.

Hence, at least some of the components controlling the compound movement of the movable pane may be yieldably biased into, and remain engaged over some portion of the travel of the movable pane with, surfaces of the guide rail. Among other things, this may improve control of the movement of the movable and reduce vibrations and noise that may otherwise be caused by components that may rattle against each other. Further, the positive engagement between the components.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention. For example, relative location or orientation terms like upper, lower, side, top, bottom, left, right, upwardly, downwardly or the like are directed to the orientation of components in the drawings which represent the position of the window assembly when installed on a vehicle, and are not intended to limit the invention unless expressly noted as such a limitation. It is contemplated that the components may be oriented and arranged in other ways.

The invention claimed is:

1. A window assembly, comprising:
   a guide rail defining a guide track;
   a guide follower received within the guide track;
   a movable pane coupled to the guide follower and movable between open and closed positions, wherein the guide follower engages a portion of the guide track and guides movement of the movable pane relative to the guide track;
   a cam having a cam surface separate from the portion of the guide track;
   a follower body coupled to the movable pane so that the follower body moves with the movable pane; and
   a cam follower carried by the follower body for movement relative to the cam surface and engageable with the cam surface, wherein the cam surface includes a portion that is inclined relative to another portion of the cam surface and the inclined portion is oriented to direct the movable pane into a seal as the movable pane moves into the closed position and wherein the follower body includes a pivot having a pivot axis about which the follower body pivots, and the pivot axis is located between an entirety of the cam follower and an entirety of the guide follower.

2. The assembly of claim 1 which also includes a secondary cam and a secondary follower engageable with the secondary cam to direct the movable pane into the closed position.

3. The assembly of claim 1 wherein the guide track has a linear portion for guiding lateral movement of the movable pane within a plane and a nonlinear portion to cause transverse movement of the movable pane relative to the plane, wherein the cam surface extends along at least a majority of the linear portion of the guide track and the cam follower is engageable with the cam surface along at least a majority of the cam surface.

4. The assembly of claim 3 which also includes a trolley coupled to the movable pane and received within the guide track, and biasing members that yieldably bias the trolley relative to the guide track.

5. The assembly of claim 3 wherein:
   the guide follower is movable within the linear portion and the nonlinear portion of the guide track, and
   the follower body is coupled to the guide follower, and wherein the linear portion of the guide track accommodates the lateral movement of the movable pane within the plane and engagement of the cam follower with the inclined portion of the cam surface causes the transverse movement of the movable pane relative to the plane.

6. The assembly of claim 5 wherein the cam follower is defined by a portion of an exterior surface of the follower body.

7. The assembly of claim 6 wherein the cam follower is defined by a flexible and resilient portion of the follower body.

8. The assembly of claim 7 wherein the flexible and resilient portion of the follower body is connected to a main body of the follower body at at least one end of the flexible and resilient portion of the follower body and defines a void between the flexible and resilient portion of the follower body and the main body of the follower body.

9. The assembly of claim 8 wherein the flexible and resilient portion of the follower body is cantilevered on the main body of the follower body.

10. The assembly of claim 8 wherein the flexible and resilient portion of the follower body is connected to the main body of the follower body at another end of the flexible and resilient portion of the follower body and the void is circumscribed by the flexible and resilient portion of the follower body and the main body of the follower body.

11. The assembly of claim 1 wherein the movable pane moves along a path of movement and the cam follower remains engaged with the cam surface as the movable pane moves along a majority of the path of movement.

12. The assembly of claim 1 wherein the cam follower is yieldably biased into engagement with the cam surface.

13. The assembly of claim 12 wherein the cam follower includes a flexible and resilient engagement surface that engages the cam surface.

14. A window assembly, comprising:
a movable pane movable between an open position and a closed position;
a guide rail that defines a track and that receives a portion of the movable pane, the track defining a path of movement of the movable pane between the open position and closed position;
a trolley coupled to the movable pane for movement with the movable pane as the movable pane moves between the open position and the closed position, the trolley being received within the track and the trolley is engaged with the guide rail;
a cam having a cam surface;
a follower body coupled to the movable pane at a first pivot so that the follower body moves with the movable pane and so that relative pivoted movement is permitted between the follower body and the movable pane, the follower body being coupled to the trolley at a second pivot to permit pivoted movement of the follower body relative to the trolley; and
a cam follower coupled to the follower body for movement relative to the cam surface and engageable with the cam surface, wherein the cam surface includes a portion that is inclined relative to another portion of the cam surface and the inclined portion is oriented to direct the movable pane into a seal when the movable pane moves into the closed position and wherein the second pivot has a pivot axis and the pivot axis is located between an entirety of the cam follower and a pivot axis of the first pivot.

15. The window assembly of claim 14 which also comprises a guide follower received within the track and spaced from the trolley, and the guide follower is coupled to one or both of the follower body and the movable pane.

16. The window assembly of claim 15 in which the track has a linear portion for guiding lateral movement of the movable pane within a plane and a nonlinear portion to guide transverse movement of the movable pane relative to the plane and wherein the guide follower moves within the nonlinear portion during a portion of the movement of the movable pane between the open position and the closed position, and the movement of the guide follower in the nonlinear portion causes the follower body to pivot relative to the trolley.

17. The window assembly of claim 16 wherein the cam surface extends along at least a majority of the linear portion of the track and the cam follower is engageable with the cam surface along at least a majority of the cam surface.

18. The window assembly of claim 15 wherein the second pivot is located between the guide follower and the cam follower.

* * * * *

UNITED STATES PATENT AND TRADEMARK OFFICE
CERTIFICATE OF CORRECTION

PATENT NO. : 9,797,177 B2  
APPLICATION NO. : 15/002100  
DATED : October 24, 2017  
INVENTOR(S) : Ronnie G. Gipson Page 1 of 1

It is certified that error appears in the above-identified patent and that said Letters Patent is hereby corrected as shown below:

On the Title Page

Item (73) Assignee: delete "Durata" and insert --Dura--

Signed and Sealed this  
Twenty-fifth Day of June, 2019

Andrei Iancu  
*Director of the United States Patent and Trademark Office*